US007756033B2

(12) United States Patent
Abbazia, Jr. et al.

(10) Patent No.: US 7,756,033 B2
(45) Date of Patent: Jul. 13, 2010

(54) SYSTEMS AND METHODS FOR MANAGING MULTICAST DATA TRANSMISSIONS

(75) Inventors: Edward W. Abbazia, Jr., Milford, CT (US); James H. Pelisson, Sandy Hook, CT (US)

(73) Assignee: Verizon Business Global LLC, Basking Ridge, NJ (US)

( * ) Notice: Subject to any disclaimer, the term of this patent is extended or adjusted under 35 U.S.C. 154(b) by 1766 days.

(21) Appl. No.: 10/836,284

(22) Filed: May 3, 2004

(65) Prior Publication Data

US 2005/0243824 A1 Nov. 3, 2005

(51) Int. Cl.
*H04L 1/00* (2006.01)
*H04L 12/26* (2006.01)

(52) U.S. Cl. .................... 370/235; 370/230
(58) Field of Classification Search ........... None
See application file for complete search history.

(56) References Cited

U.S. PATENT DOCUMENTS

| | | | |
|---|---|---|---|
| 5,331,637 A | 7/1994 | Francis et al. | |
| 5,602,841 A | 2/1997 | Lebizay et al. | |
| 5,903,559 A | 5/1999 | Acharya et al. | |
| 5,946,316 A | 8/1999 | Chen et al. | |
| 6,006,267 A | 12/1999 | Nguyen et al. | |
| 6,058,113 A | 5/2000 | Chang | |
| 6,088,732 A | 7/2000 | Smith et al. | |
| 6,112,236 A * | 8/2000 | Dollin et al. | 709/224 |
| 6,151,696 A | 11/2000 | Miller et al. | |
| 6,154,463 A | 11/2000 | Aggarwal et al. | |
| 6,182,109 B1 | 1/2001 | Sharma et al. | |
| 6,259,701 B1 | 7/2001 | Shur et al. | |
| 6,279,029 B1 | 8/2001 | Sampat et al. | |
| 6,282,175 B1 * | 8/2001 | Steele et al. | 370/254 |
| 6,331,983 B1 | 12/2001 | Haggerty et al. | |
| 6,353,596 B1 | 3/2002 | Grossglauser et al. | |
| 6,415,330 B1 | 7/2002 | Okanoue | |
| 6,434,622 B1 * | 8/2002 | Monteiro et al. | 709/231 |
| 6,434,626 B1 | 8/2002 | Prakash et al. | |
| 6,483,832 B1 | 11/2002 | Civanlar et al. | |
| 6,512,776 B1 | 1/2003 | Jones et al. | |
| 6,515,967 B1 | 2/2003 | Wei et al. | |
| 6,557,111 B1 | 4/2003 | Theimer et al. | |
| 6,940,821 B1 * | 9/2005 | Wei et al. | 370/244 |

(Continued)

OTHER PUBLICATIONS

"The UTP Plan Quotation Data Feeds$^{SM}$ (UQDF$^{SM}$): Data Feed Interface Specification", Published by NASDAQ Market Data Distribution, Rockville, Maryland, Version 4.0a, Revised: Oct. 31, 2003.

(Continued)

*Primary Examiner*—Ricky Ngo
*Assistant Examiner*—Clemence Han

(57) ABSTRACT

A system enables monitoring a multicast data feeds over a network. The system may include a multicast-enabled network device for transmitting a multicast feed from a multicast feed source to a user device via a computer network. A feed agent may be operatively coupled to the multicast-enabled network device for collecting and storing multicast feed data from the multicast feed source. A management server may be operatively connected to the feed agent for receiving multicast feed data collected by the feed agent. The management server may include a web server for receiving requests for multicast feed data over the network via a web interface.

25 Claims, 9 Drawing Sheets

U.S. PATENT DOCUMENTS

| | | | |
|---|---|---|---|
| 7,313,613 B1* | 12/2007 | Brooking et al. | 709/223 |
| 2001/0034793 A1 | 10/2001 | Madruga et al. | |
| 2002/0085506 A1 | 7/2002 | Hundscheidt et al. | |
| 2003/0142625 A1* | 7/2003 | Wan et al. | 370/235 |
| 2004/0054680 A1* | 3/2004 | Kelley et al. | 707/100 |
| 2004/0162901 A1* | 8/2004 | Mangipudi et al. | 709/225 |
| 2004/0260745 A1* | 12/2004 | Gage et al. | 709/200 |
| 2006/0245371 A1* | 11/2006 | Joiner et al. | 370/252 |
| 2006/0294259 A1* | 12/2006 | Matefi et al. | 709/248 |
| 2007/0140128 A1* | 6/2007 | Klinker et al. | 370/238 |
| 2008/0281963 A1* | 11/2008 | Fletcher et al. | 709/224 |

OTHER PUBLICATIONS

"Broadcast & Multicast", The Moves Institute, www.movesinstitute.org/~mcgredo/mv3500/lectures/lecture14.ppt, Print Date: Apr. 28, 2004.

"The UTP Plan Trade Data Feeds$^{SM}$ (UTDF$^{SM}$): Direct Subscriber Interface Specification", Published by: NASDAQ Market Data Distribution, Version 4.1, Revised Apr. 7, 2004.

"MCI Financial Extranet MFX Customer Premises Overview", MCI Confidential Document, Mar. 22, 2004, 10 pages.

Leelanivas, Manoj; "Introduction to IP Multicast David Meyer Cisco Systems", Jun. 17, 1998. http://www.nanog.org/mtg-9806/ppt/davemeyer/.

Deering, S., "RFC 1112-Host extensions for IP multicasting", Stanford University, Aug. 1989.

"Nasdaq to Introduce IP Multicasting Version of Its Data Feed Products", The Nasdaq Stock Market, Inc. Vendor Alert #1999-4, Vendor Technical Notice #1999-6, Feb. 1999.

Mustakallio, Mikko, "Multicasting-Issues and Networking Support", Oct. 4, 2002, http://mia.ece.uic.edu/~papers/WWW/MultimediaStandards/chapter16.pdf.

Almeroth, Kevin C., "IP Multicast Initiative (IPMI), The Evolution of Multicast: From the MBone to Inter-Domain Multicast to Internet2 Deployment", Stardust.com State-of-the-Art Series. Sep. 23, 1999, 27 pages.

Apisdorf et al., "OC3MON: Flexible, Affordable, High-Performance Statistics Collection," Proceedings of INET '97, Kuala Lumpur, Malaysia, Jun. 1997.

Ca'Ceres et al., "Multicast-Based Inference of Network-Internal Loss Characteristics," Comp. Sci. Tech. Rep. 98-17, University of Massachusetts at Amherst, Feb. 1998, ftp://gaia.cs.umass.edu/pub/CDHT98:MINC.ps.z.

Miller et al., "Performance Measurement on the vBNS," In Proceedings of the *Networld+Interop Engineers Conference '98*, Las Vegas, NV, May 1998.

"Internet Group Management Portocol", Version 2, RFC 2236, Nov. 1997.

Protocol Independent Multicast-Sparse Mode (PIM-SM , RFC 2362, Jun. 1998.

Almeroth, "The Evolution of Multicast: From the MBone to Inter-Domain Multicast to Internet2 Deployment", Dept. of Computer Sci., Univ. Of California, Santa Barbara,, Oct. 1999, pp. 1-25.

Ca'Ceres et al., "Interferring Link-Level Performance from End-to-End Multicast Measurements," Apr. 1999, pp. 1-10.

Claffy et al., "The nature of the Beast: Recent Traffic Measurements From an Internet Backbone", Apr. 1998, http://www.caida.org/outreach/papers/Inet98/.

Meyer et al., "Glop Addressing in 23/8", Feb. 2000, pp. 1-5, ftp://ftp.isj.edu/in-notes/rfc2770.txt.

Thompson et al., "Wide-Area Internet Traffic Patterns and Characteristics" (Extended Version); Abridged Version of Paper appears in IEEE Network, Nov./Dec. 1997.

\* cited by examiner

FIG. 10

SYSTEMS AND METHODS FOR MANAGING MULTICAST DATA TRANSMISSIONS

FIELD OF THE INVENTION

The present invention relates generally to networking and communications technology and, more particularly, to systems and methods for multicasting data from a source to one or more destinations.

BACKGROUND OF THE INVENTION

Digital communications networks, such as local or wide area networks (LANs, WANs), the Internet, etc., are well-known networks for permitting information stored at one location to be distributed to one or more users situated at geographically different locations. The information (also referred to herein as a "message" or "packet") can take any of a number of forms including, but not limited to, text, still image, audio, and video information.

Most digital communications networks operate under the principal of point-to-point or connection-oriented communications (e.g., such as transmission control protocol over internet protocol (TCP/IP)), wherein information is exchanged discretely between one requesting party and one responding party. This manner of connectivity ensures reliability by establishing a connection between each and every receiving system using a connection based protocol. If communication with multiple systems is desired, unique connections are formed with each system, in turn. Unfortunately, the overhead associated with creating and managing a connection between a sending system and a number of receiving systems is prohibitively expensive when there are a large number of receiving systems or the transactions are numerous.

Methods have been developed for reducing the overhead associated with connection based protocols, by using connectionless protocols, such as UDP (user datagram protocol) over an IP network. These connectionless protocols typically rely on a broadcast or "multicast" model wherein a single message is broadcast to a multiple receiving systems without forming a connection with the individual systems. Essentially, multicasting enables a source to transmit messages to a plurality of hosts which have been collectively identified by a single IP destination address, rather than to each hosts' unique IP address individually.

IP multicasting is a receiver-based concept; receivers join a particular multicast session group by using a protocol such as the Internet Group Management Protocol (IGMP) to inform a multicast-enabled network device or other network device on their subnetwork of their intention. Traffic is then delivered to all members of that group by the network infrastructure. To verify current membership, the local multicast network device periodically sends an IGMP host membership query to the "all-hosts" group.

For delivery of a multicast packet from the source to the destination nodes on other networks, multicast network devices need to exchange the information they have gathered from the group membership of the hosts directly connected to them. There are many different algorithms and protocols for exchanging this routing information, such as Distance Vector Multicast Routing Protocol (DVMRP), Multicast extension to Open Shortest Path First (MOSPF), and Protocol Independent Multicast (PIM). Based on the routing information obtained through one of these protocols, whenever a multicast packet is sent out to a multicast group, multicast-enabled network devices decide whether to forward that packet to their network(s) or not. Finally, the network device determines whether there is any member of that particular group on its physically attached networks based on the IGMP information and decides whether to forward the packet.

The multicast approach eliminates the undesirable overhead associated with forming connections with each system, but suffers from the inability to guarantee receipt of messages to all systems. For IP networks, multicast is unreliable by design in order to reduce overhead of sending packets to multiple destinations.

Modified messaging protocols have been developed to address the problem of high reliability in the context of large messages consisting of hundred of thousands or millions of packets. Such protocols send data from a sending system to multiple receiving systems connected in an IP network using IP multicast that reduces sending overhead. Current solutions focus on high reliability for relatively few destinations as would occur in video conferencing or dynamic whiteboard applications or may focus on many destinations for large data sets, such as streaming audio or video data, where dropping some packets is not viewed as a serious problem.

Unfortunately, these solutions to the inherent unreliability of IP multicast do not address the need for real-time management of the multicast feeds from a monitoring perspective, while maintaining low overhead and resource requirements. There is therefore a need for a multicast management system that will enable efficient multicasting of messages while concurrently providing management monitoring functionality to assist in network administration and troubleshooting.

SUMMARY OF THE INVENTION

In accordance with one implementation consistent with the principles of the invention, a system enables monitoring and management of a multicast data feed. The system includes a multicast-enabled network device for transmitting a multicast feed from a multicast feed source to a user device via a network. A feed agent is operatively coupled to the multicast-enabled network device for collecting and storing multicast feed data from the multicast feed source. A management server is operatively connected to the feed agent for receiving the multicast feed data collected by the feed agent.

In another implementation consistent with the principles of the invention, a method is provided for monitoring multicast feeds transmitted via a computer network. The method may include receiving, at a network device, a multicast data feed from a data source. Data statistics regarding the multicast data feed are logged. The multicast data feed is transmitted to a user device and the logged data statistics are transmitted to a server.

In yet another implementation consistent with the principles of the invention, a computer-readable medium is provided that contains instructions for controlling one or more processors to perform a method for monitoring multicast feeds transmitted via a network. The method may include receiving, at a network device, a multicast data feed from a data source. Data statistics regarding the multicast data feed are logged by a feed agent. The multicast data feed is transmitted to a user device and the logged data statistics are transmitted to a management server. The logged data statistics are stored at a database associated with the management server. Stored data statistics are retrieved from the database in response to a request from a client computing device.

Retrieved data statistics are then transmitted to the client computer device via a web interface.

BRIEF DESCRIPTION OF THE DRAWINGS

The accompanying drawings, which are incorporated in and constitute a part of this specification, illustrate an implementation of the invention and, together with the description, explain the invention. In the drawings.

FIG. 10 is an exemplary graphical interface for enabling creation of a new report in accordance with principles of the invention.

DETAILED DESCRIPTION OF THE PREFERRED EMBODIMENTS

The following detailed description of implementations consistent with the present invention refers to the accompanying drawings. The same reference numbers in different drawings may identify the same or similar elements. Also, the following detailed description does not limit the invention. Instead, the scope of the invention is defined by the appended claims and equivalents.

Systems and methods consistent with the present invention provide techniques for managing and monitoring multicast user datagram protocol (UDP) packets or messages or other suitable data units for simultaneous receipt by multiple users. According to one implementation, a feed agent monitors a multicast feed and transmits feed statistics to a management server for storage, subsequent processing or retrieval.

Exemplary System

Figure 1:
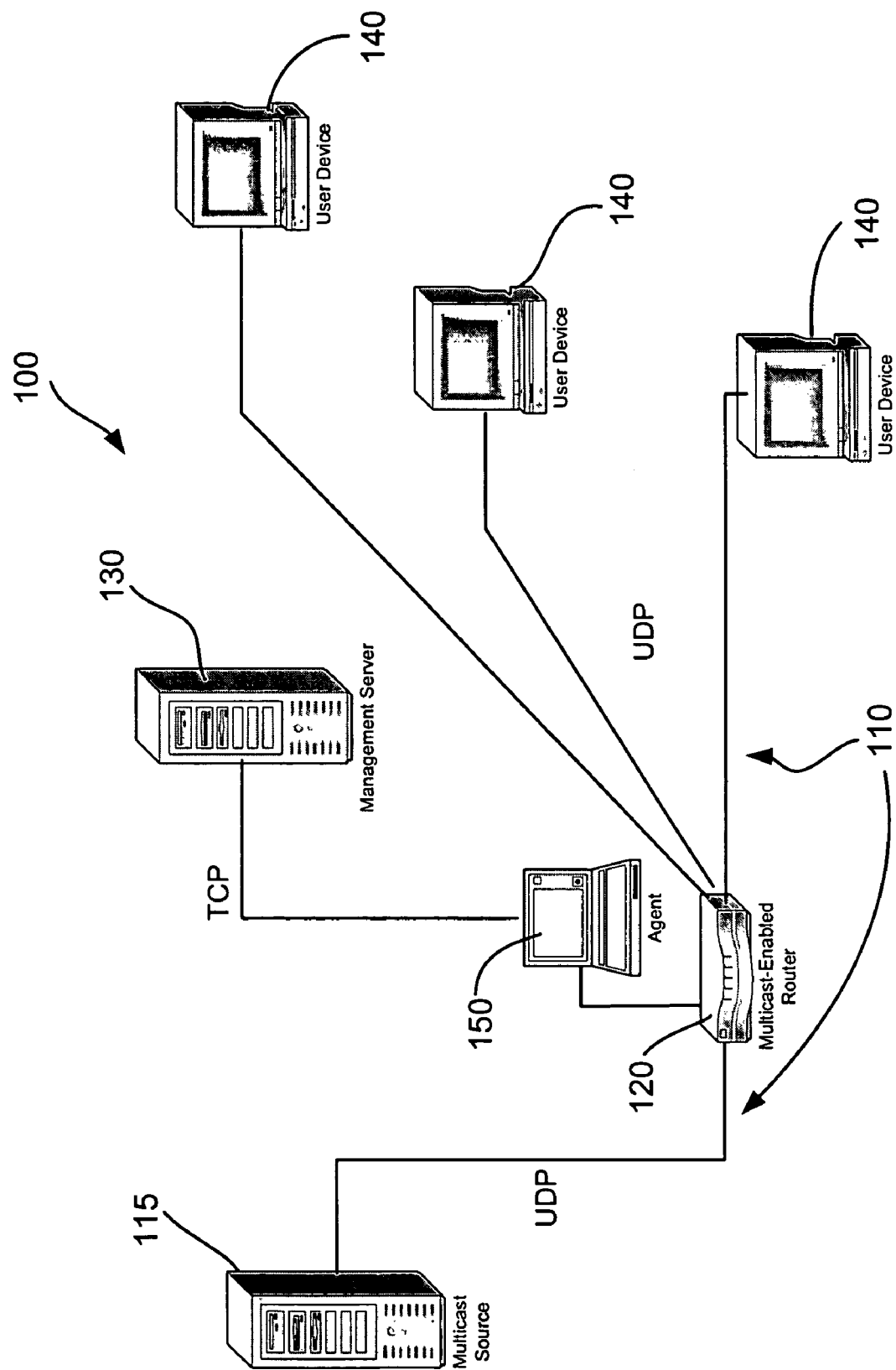
FIG. 1 is an exemplary diagram of a system in which methods and systems consistent with the present invention may be implemented.

FIG. 1 illustrates an exemplary system 100 in which methods and systems consistent with the present invention may be implemented. In FIG. 1, system 100 may include a network 110 that interconnects a multicast feed source 1115, a multicast-enabled network device 120, a management server 130 and a group of user devices 140. In one implementation consistent with principles of the invention, a feed agent 150 is operatively coupled to the multicast-enabled network device 120 for monitoring multicast activity on network device 120. It will be appreciated that a typical system may include more or fewer devices than illustrated in FIG. 1. Moreover, system 100 may include additional devices (not shown) that aid in the transfer, processing, and/or reception of data.

The network 110 may include, for example, the Internet, an intranet, a local area network (LAN), a metropolitan area network (MAN), a wide area network (WAN), and/or some other similar type of network. In fact, the network 110 may include any type of network or combination of networks that permits routing of information from a particular source to a particular destination.

The network device 120 may be any suitable multicast-enabled device for forwarding messages and packets via UDP. Examples of suitable network devices include routers, switches, hubs, and host systems. User devices 140 may include a type of computer system, such as a mainframe, minicomputer, or personal computer, customer premises equipment (CPE), and/or some other similar type of device that is capable of transmitting and receiving information to/from the network 110. The user device 140 may connect to the network 110 via any conventional technique, such as a wired, wireless, or optical connection.

Figure 2:
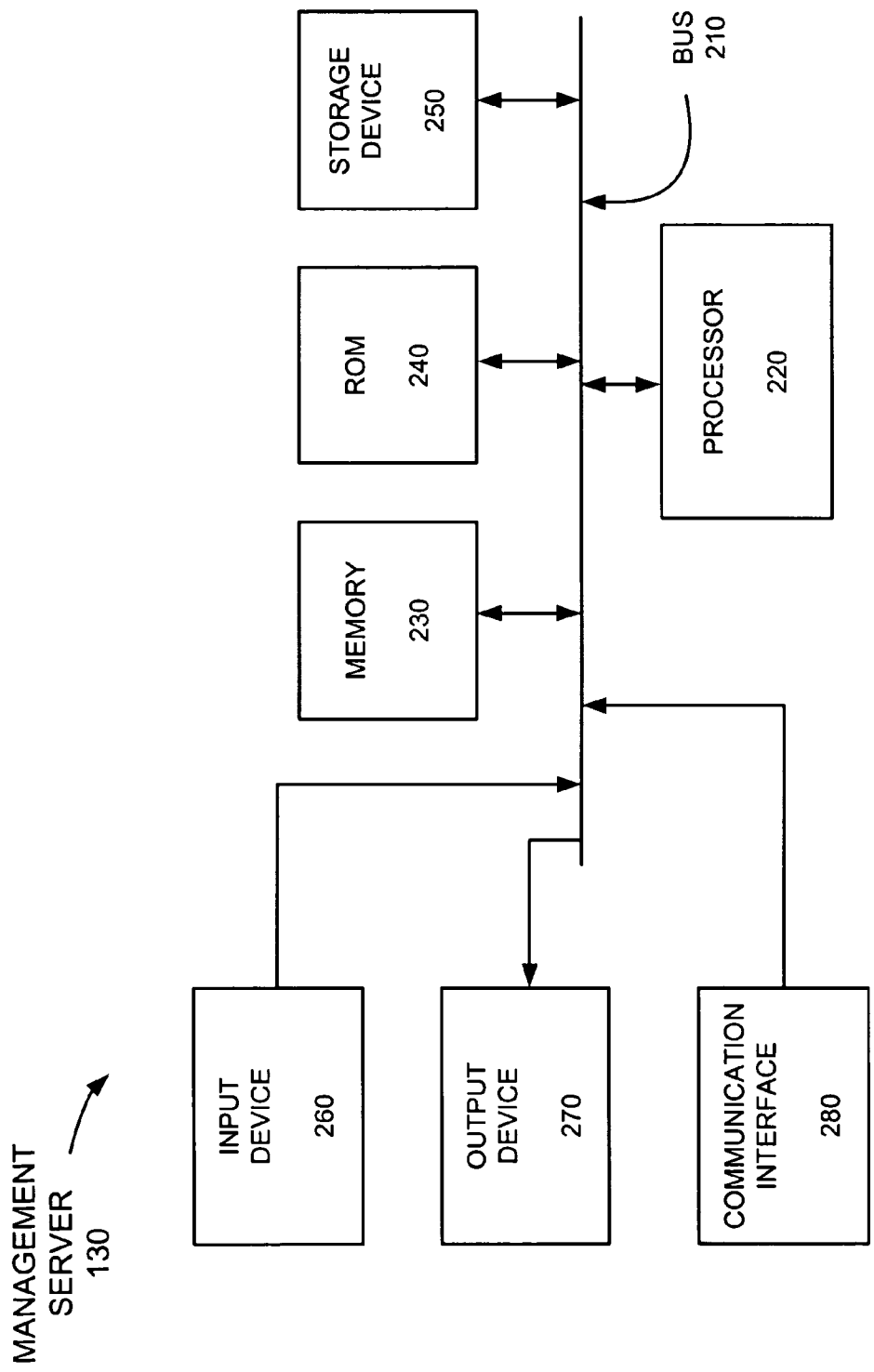
FIG. 2 is a block diagram illustrating an exemplary configuration of a management server of FIG. 1 in an implementation consistent with the present invention.

FIG. 2 illustrates an exemplary configuration of a management server 130 of FIG. 1 in an implementation consistent with the present invention. In FIG. 2, the management server 130 includes a bus 210, a processor 220, a memory 230, a read only memory (ROM) 240, a storage device 250, an input device 260, an output device 270, and a communication interface 280. The bus 210 may include one or more conventional buses that permit communication among the components of the management server 130.

The processor 220 may include any type of conventional processor or microprocessor that interprets and executes instructions. The memory 230 may include a random access memory (RAM) or another type of dynamic storage device that stores information and instructions for execution by the processor 220. The memory 230 may also be used to store temporary variables or other intermediate information during execution of instructions by processor 220.

The ROM 240 may include a conventional ROM device and/or another type of static storage device that stores static information and instructions for the processor 220. The storage device 250 may include a magnetic disk or optical disk and its corresponding drive and/or some other type of magnetic or optical recording medium and its corresponding drive for storing information and/or instructions.

The input device 260 may include any conventional mechanism that permits an operator to input information to the management server 130, such as a keyboard, a mouse, a microphone, a pen, a biometric input device, such as voice recognition device, etc. The output device 270 may include any conventional mechanism that outputs information to the operator, including a display, a printer, a speaker, etc.

The communication interface 280 may include any transceiver-like mechanism that enables the management server 130 to communicate with other devices and/or systems, such as feed agent 150 or network device 120. For example, the communication interface 280 may include a modem or an Ethernet interface to a network. Alternatively, communication interface 280 may include other mechanisms for communicating via a data network.

Returning to FIG. 1, management server 130 may operate to communicate with multicast feed agent 150 to collect statistics and data relating to multicast UDP feeds passing through network device 120. In one implementation consistent with principles of the invention, network transmissions between management server 130 and feed agent 150 occur via TCP (transmission control protocol) rather than UDP (user datagram protocol). As will be discussed in additional detail below, once information has been obtained from feed agent 150, management server 130 may issue notification traps upon the occurrence of predefined events. Additionally, in one embodiment, management server 130 may include a web server for enabling users to monitor the feed statistics and related information and generate reports in substantially real time. In one embodiment, a user may perform these functions through a single point of entry using a network accessible web interface.

Figure 3:
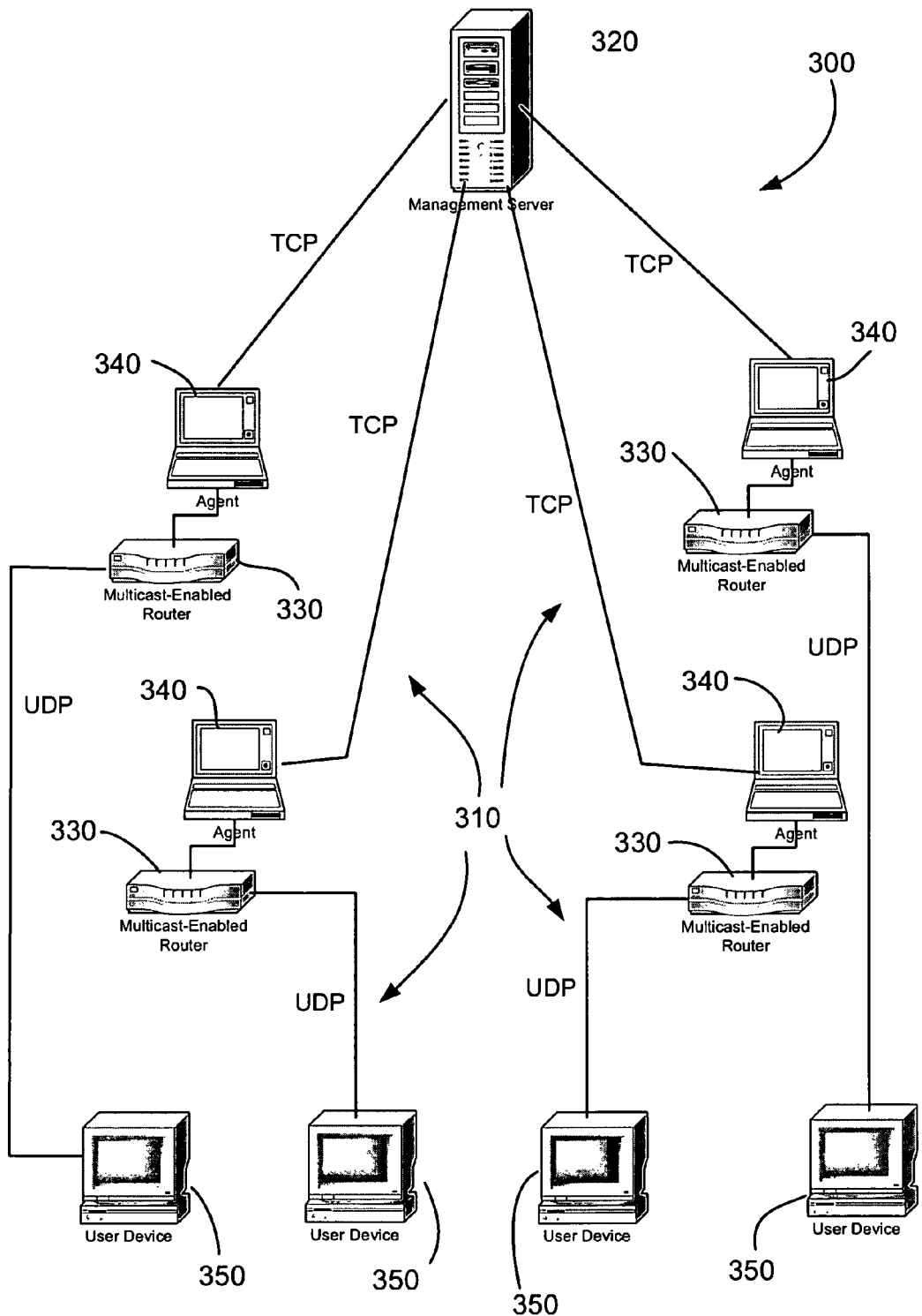
FIG. 3 is a second exemplary diagram showing a multicast monitoring system in which systems and methods, consistent with the principles of the invention, may be implemented.

FIG. 3 illustrates a second exemplary multicast monitoring system 300 in which systems and methods, consistent with the principles of the invention, may be implemented. System 300 may include a network 310 that interconnects a management server 320, a plurality of multicast-enabled network devices 330, and a plurality of user devices 350. As discussed generally above, each multicast-enabled network device 330 is operatively coupled to a feed agent 340. As illustrated, network 310 may include a plurality of device interconnects for enabling exchange of data and other information between management server 320, network devices 330 and user devices 350.

In operation, network devices 330 forward multicast feed data or other data streams from an upstream source (not shown) to user devices 350 via user datagram protocol (UDP). In one implementation consistent with principles of the invention, the multicast feed data may be financial data relating to financial market quotes or transactions. More particularly, the multicast data may include packets and/or messages relating to stock market (e.g., NASDAQ, NYSE, etc.) financial data. As discussed briefly above, UDP enables efficient packaging and distribution of data without requiring the overhead or bandwidth associated with other transmission protocols (e.g., TCP). Because UDP multicasting cannot support quality of service QoS capabilities or guarantee receipt or delivery of transmitted messages, management server 320 operates to poll each feed agent 340 regarding its transmission state and data flow statistics for its associated network device 330. In one implementation consistent with principles of the invention, management server 320 is configured to reside on a computing device running the Linux operating system, although it should be understood that any suitable operating system may be utilized.

In one implementation consistent with principles of the invention, management server 320 includes a data collection daemon for polling a predefined listing of agent IP addresses. Similarly, feed agents 340 also include an agent daemon for listening to the multicast feed(s) passing through the network device 330 to which it is attached. Data relating to the feed(s) are then passed to server 320 upon request or automatically based upon a predefined schedule. Additional details regarding the collection and exchange of data between agents 340 and server 320 will be described below.

In an alternative embodiment consistent with principles of the invention, multiple management servers 320 may be implemented in system 300. In accordance with this implementation, agents 340 are periodically queried by each of the multiple management servers 320 so as to provide a redundant management system should one or more of the management servers 320 fail.

Exemplary Processing

Figure 4:
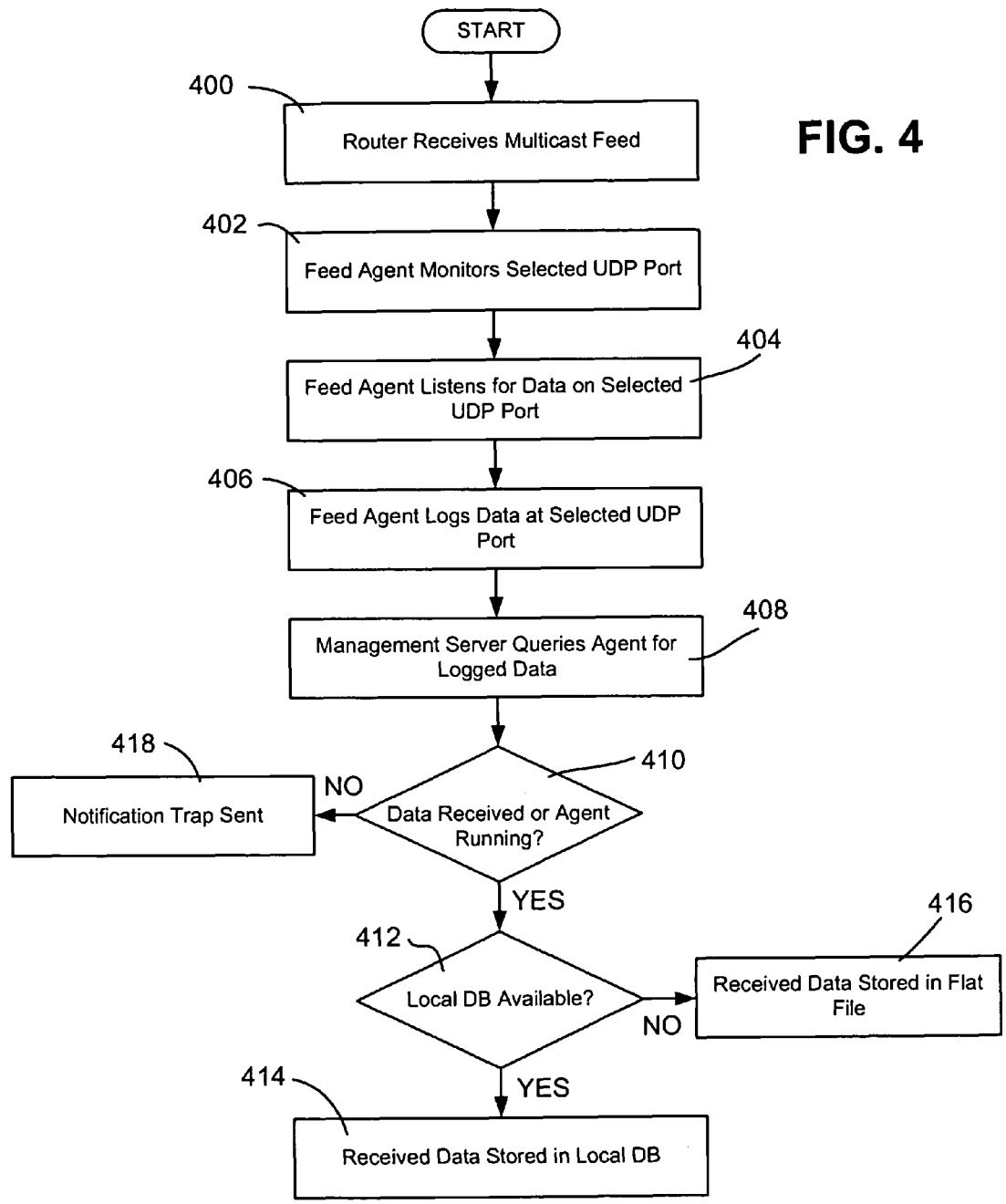
FIG. 4 is an exemplary flow diagram illustrating one method for monitoring multicast data streams in accordance with one implementation consistent with the principles of the invention.

FIG. 4 is an exemplary flow diagram illustrating one method for monitoring multicast data streams in accordance with one implementation consistent with the principles of the invention. Processing may begin with a multicast-enabled network device 120 receiving a multicast feed from a data server or other source (act 400). As is understood in the art, UDP multicasting is enabled by transmitting UDP packets from a source to an IP address associated with a class D multicast group. Each multicast-enabled network device in the group is then able to transmit received packets to members of the defined group. Once received at network device 120, feed agent 150 monitors data on a UDP port associated with the multicast feed (act 402). Agent 150 may then periodically listen for data on the port (act 404) and log the data for subsequent retrieval by management server 130 (act 406).

Management server 130 may periodically requests the data logged in act 406 from the agent 150 (act 408). In one implementation consistent with principles of the invention, requests and data passed between server 130 and agent 150 are made via TCP. Further, it should be understood that server 130 may interact simultaneously with a plurality of agents 150 (as in FIG. 3) with data from each agent being monitored and stored independently for subsequent review and processing. Next, server 130 receives the requested data (act 410) and determines whether a local database is available (act 412). If available, the received data is stored in the database (act 414) for subsequent processing. However, if it is determined that the database is not available, information received from agent 150 may be stored to a local data file (e.g., a "flat" files such as a delimited text file) (act 416), thereby ensuring that received data is not lost.

If requested data is not received in act 410, this may be because either no data is flowing through the network device or because agent 150 is no longer up and running. Regardless of the reason, if no data is received, a notification trap is sent (e.g., via SNMP (simple network management protocol) or any suitable method) to a network administrator for review (act 418). In one embodiment, traps of this nature include a description of the feed and its problem. In this manner, failure of agent 150 or loss of data flow results in a notification being sent to a network administrator.

Figure 5:
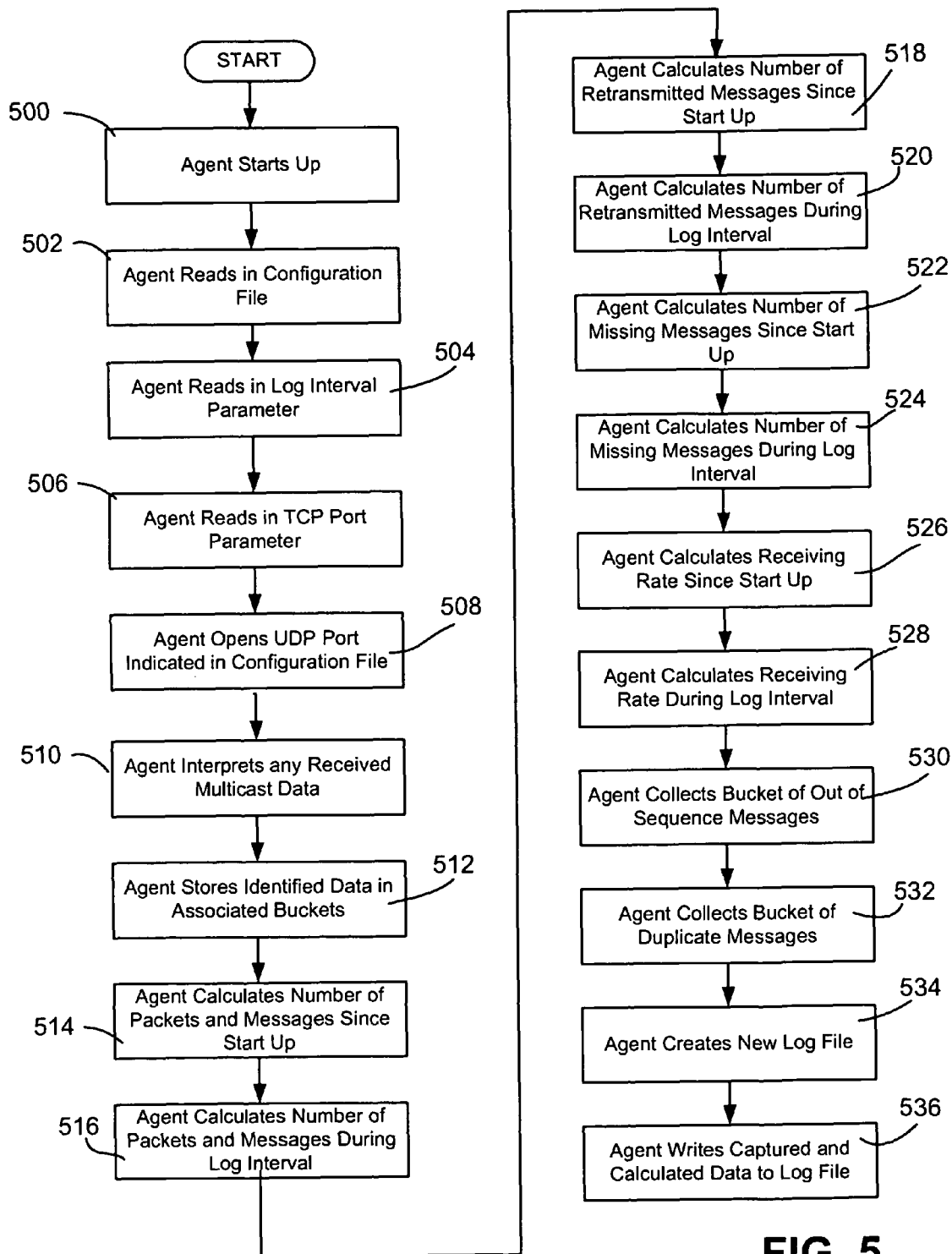
FIG. 5 is an exemplary flow diagram illustrating one method for receiving and logging multicast stream data in accordance with one implementation consistent with the principles of the invention.

FIG. 5 is an exemplary flow diagram illustrating one method for receiving and logging multicast stream data in accordance with one implementation consistent with the principles of the invention. Processing may begin with the start up of agent 150 (act 500). During start up, a configuration file is read into the agent application (act 502). In one embodiment, the configuration file includes, for each feed to be monitored, a user selection of the feed to be monitored, the UDP port on which the feed appears and the multicast IP address associated with the feed. In addition to elements within a configuration file, agent 150 also reads parameters relating to: 1) a log interval (the time period during which entries to the log file are made) (act 504), and 2) a TCP port associated with incoming requests from the management server 130 (act 506).

Next, the agent 150 opens the UDP port defined in the configuration file (act 508). Once the UDP port associated with the multicast stream is opened, information from the stream may be read and captured by agent 150 including any payload data associated with the stream. Next, agent 150 interprets the Multicast data feed specifications and sorts any identified data as it is read by the agent's interface with the selected port (act 510). Accordingly, the existence of individual packets and messages are identified as well as payload information relating to a messages sequence number and and retransmission flags. Agent 150 then stores the identified data in associated holding "buckets" based on the interval defined during start up (512). By tracking sequence numbers, the agent keeps a running total of the number of packets and messages in "buckets", and can then calculate other information such as duplicates, out of sequence, per second rates once this information has been identified.

Once the data has been stored in act 512, agent 150 uses the identified sequence number to calculate a number of packets and messages received since the agent application has started or after reset of a message sequence number (act 514). Alternatively, this calculation may be initialized at the start of the day or the start of the test cycle. Next, agent 150 calculates a number of packets and messages received during a user-defined time interval (act 516).

Agent 150 then calculates a number of re-transmitted messages since the application has started (or, alternatively, after reset of the message sequence number, the start of the day or the start of the test cycle) (act 518). Next, using any identified and stored retransmission flags from the received data feed, agent 150 calculates a number of retransmitted messages during the user-defined time interval (act 520). Agent 150 then calculates a number of missing messages since the application has started (or, alternatively, after reset of the message sequence number, the start of the day or the start of the test cycle) using the stored sequence number information (act 522). Next, agent 150 calculates a number of missing messages during the user-defined time interval (act 524). Next, agent 150 calculates the receiving rates (the number of packets and messages received per second) since the application has started (or, alternatively, after reset of the message sequence number, the start of the day or the start of the test cycle) (act 526). The agent 150 then calculates the receiving rates (number of packets per second, number of messages per second) for the user-defined time interval (act 528). Additionally, agent 150 collects a "bucket" of out of sequence messages (act 530), again using the received multicast stream message sequence number information. Similarly, agent 150 collects a "bucket" of duplicate messages (act 532).

Once all data for a given interval has been calculated/captured, agent 150 creates a new log file at defined intervals (act 534) and writes computed and calculated statistics to the log file at the end of each user-defined interval (act 536).

Figure 6:
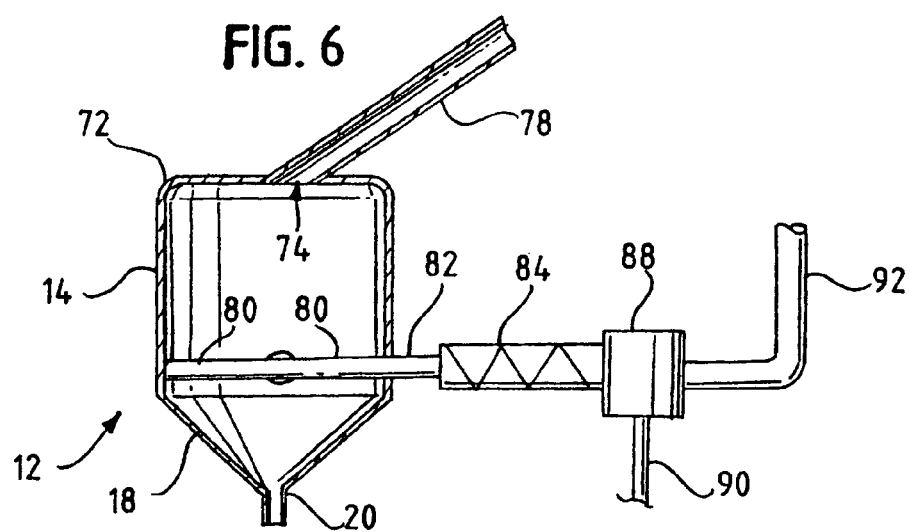
FIG. 6 is an exemplary flow diagram illustrating one method for querying an agent in accordance with one implementation consistent with the principles of the invention.

Referring to the management server 130, FIG. 6 is an exemplary flow diagram illustrating one method for querying agent 150 in accordance with one implementation consistent with the principles of the invention. Processing may begin with the start up of management server 130 (act 600). During start up, a configuration file is read into the management server application (act 602). In one embodiment, the configuration file includes host names and port numbers for each agent to be monitored/queried. In an alternative embodiment, the configuration file includes a file name associated with a file that includes the host names and port numbers rather than the names and numbers themselves.

In addition to elements contained within or referenced by the configuration file, server 130 also preferably reads parameters relating to: 1) a log interval (the time interval during which the server 130 will request data from agent 150) (act 604); 2) a trap destination file that contains the machine names to which the server 130 sends traps either on failing to receive data from agent or when the free space on the file system falls below the free disk space threshold (act 606); 3) a file system directory being monitored for disk space (act 608); and 4) a minimum free disk space to be monitored (act 610).

Once configuration has been completed, the server 130 periodically (e.g., at the time interval specified during start up) requests data from the agent 150 specified in the configuration file (act 612). Next, server 130 receives the requested data (act 614) and determines whether a local database is available (act 616). If available, the received data is stored in the local database (act 618) for subsequent retrieval/processing. However, if it is determined that the database is not available, information received from agent 150 may be stored to a local flat data file (e.g., a delimited text file) (act 620), thereby ensuring that received data is not lost.

If requested data is not received in act 614, a notification trap is sent via SNMP or any suitable method to the entities/machines identified during configuration for review (act 622). In one embodiment, traps of this nature include a description of the feed and its problem. In this manner, failure of agent 150 or loss of data flow results in a notification being sent to a network administrator or other network entity. Next, the file system identified during configuration is queried regarding its available hard disk drive space (act 624). If the available hard disk drive space is less than the threshold level established during configuration, a trap is sent to notify management of this occurrence (act 626).

Figure 7:
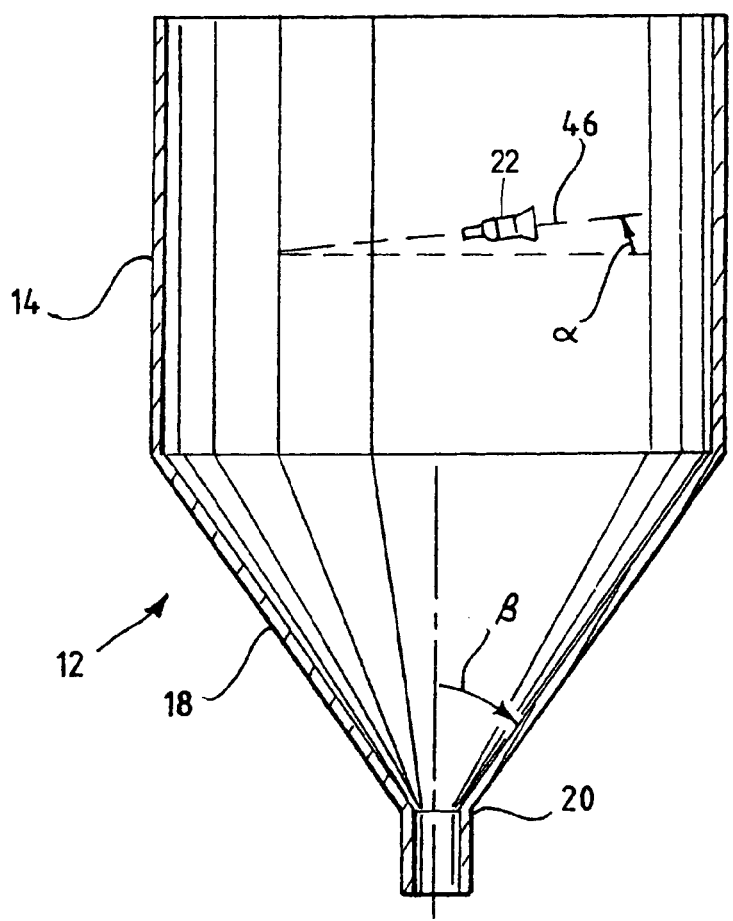
FIG. 7 is an exemplary flow diagram illustrating one method for enabling monitoring of multicast data statistics over a computer network in accordance with the principles of the invention.

FIG. 7 is an exemplary flow diagram illustrating one method for enabling monitoring of multicast data statistics over a computer network in accordance with the principles of the invention. As discussed briefly above, in one implementation consistent with principles of the invention, management server 130 includes a web server application configured to distribute information received from feed agents to client computer systems, such as user devices 140, over a computer network, such as a LAN, WAN or the Internet.

Initially, the user device 140 requests a web page associated with the multicast management server 130 by issuing a URL request through network 110 to the management server 130 (act 700). A URL consistent with the present invention may be a simple URL of the form:

<protocol_identifier>://<server_address>/<web_page_path>

A "protocol_identifier" of "http" specifies the conventional hyper-text transfer protocol. A URL request for a secure network communication session typically utilizes the secure protocol identifier "https," assuming that the client browser and web server each support and implement the secure sockets layer (SSL). The "server_address" is typically of the form "prefix.domain," where the prefix is typically "www" to designate a web server and the "domain" is the standard network sub-domain.top-level-domain of the server 130. Alternatively, a server's IP address may be substituted. The optional "web_page_path" is provided to specifically identify a particular hyper-text page maintained by the server 130.

In response to a received URL identifying an existing web page, the server 130 returns the web page, subject to the HTTP protocol, to the user device 140 (act 702). This web page typically incorporates a web interface including both textual and graphical information and having embedded hyper-text links, commonly referred to as hyperlinks, that permit the user to readily select a next URL. Exemplary embodiments of several web pages associated with server 130 are described in additional detail below.

Generally speaking, the web interface allows users to monitor feed statistics for any/all the agents 150 and to generate various reports relating to these statistics. Initially, the server 130 receives login information (e.g., username/password) from a user device 140 (act 704). Once authenticated (act 706), the server 130 returns a live feed page to user device 140 (act 708). In one implementation consistent with principles of the present invention, the live feed page includes live feed statistics from the selected agents 150.

Figure 8:
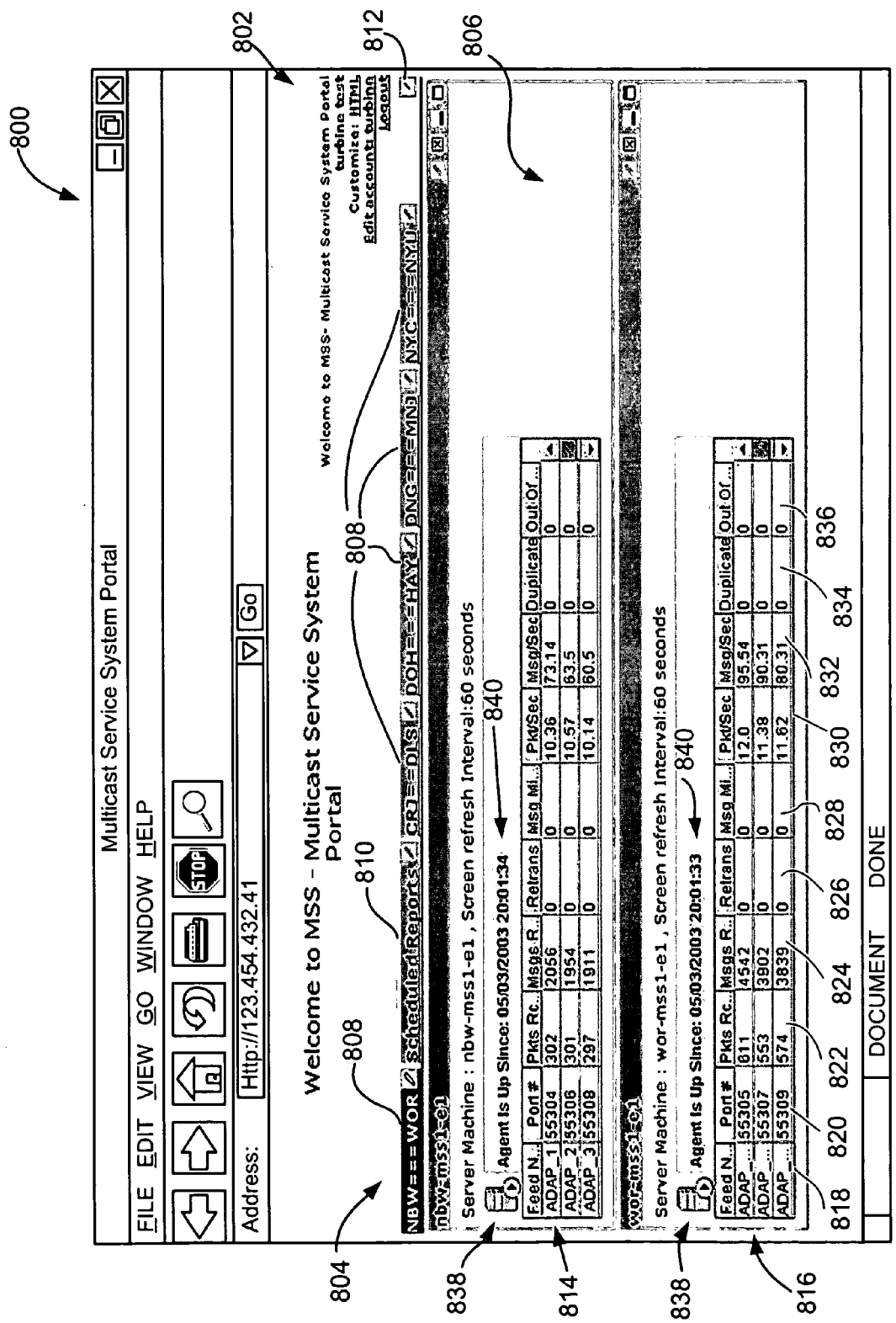
FIG. 8 is an exemplary graphical user interface of a live feed page in an implementation consistent with the principles of the invention.

FIG. 8 is an exemplary graphical user interface of a live feed page 800 in an implementation consistent with the principles of the invention. In general, live feed page 800 may be broken down into three distinct areas, a management/administration area 802, a feed/report selection bar 804 and an agent portlets area 806. Regarding the management/administration area 802, options or hyperlinks 804 are preferably shown that enable logged in users to establish page properties and account settings. Regarding the feed/report selection bar 804, the bar is dynamically configured to include selectable tabs 808 relating to each agent or pair of agents. In one implementation consistent with principles of the invention, user devices 140 simultaneously receive UDP multicast streams from a pair of multicast-enabled network devices 120 preferably connected to disparate data sources. In this manner, redundant data feeds may be received to help reduce any effects of lost packets or messages. Returning to FIG. 8, a reports tab 810 is provided for enabling users to create and print reports relating to multicast data. Lastly, a customize icon 812 is also provided. Selection of the customize icon 812 results in the display of a customize page which enables user-adjustment of the page layout as well as a selection of portlets to display in portlets area 806 and tabs 808.

Figure 9:
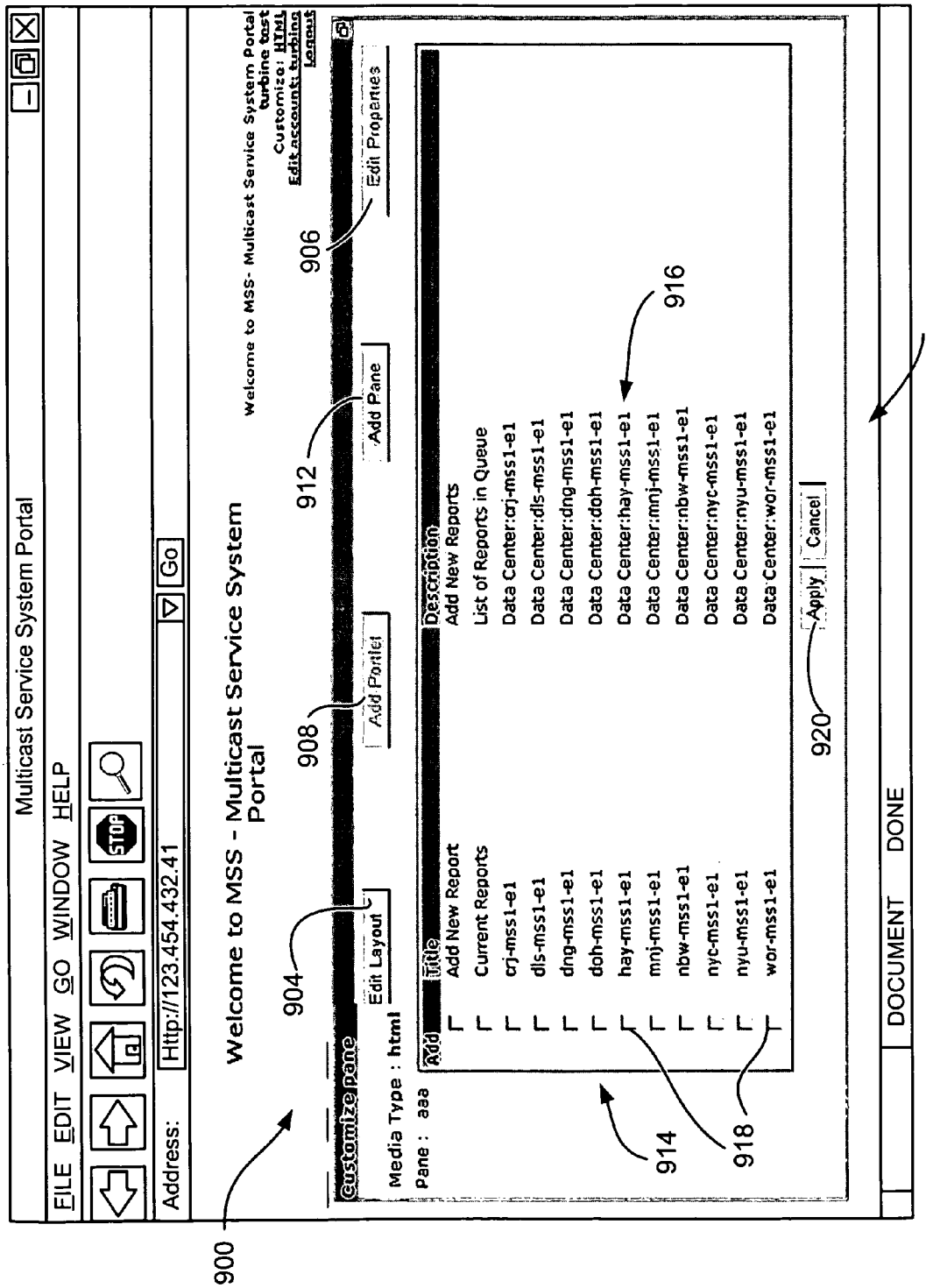
FIG. 9 is an exemplary graphical user interface of a customize page 900 in accordance with an implementation consistent with the principles of the invention.
Figure 1:
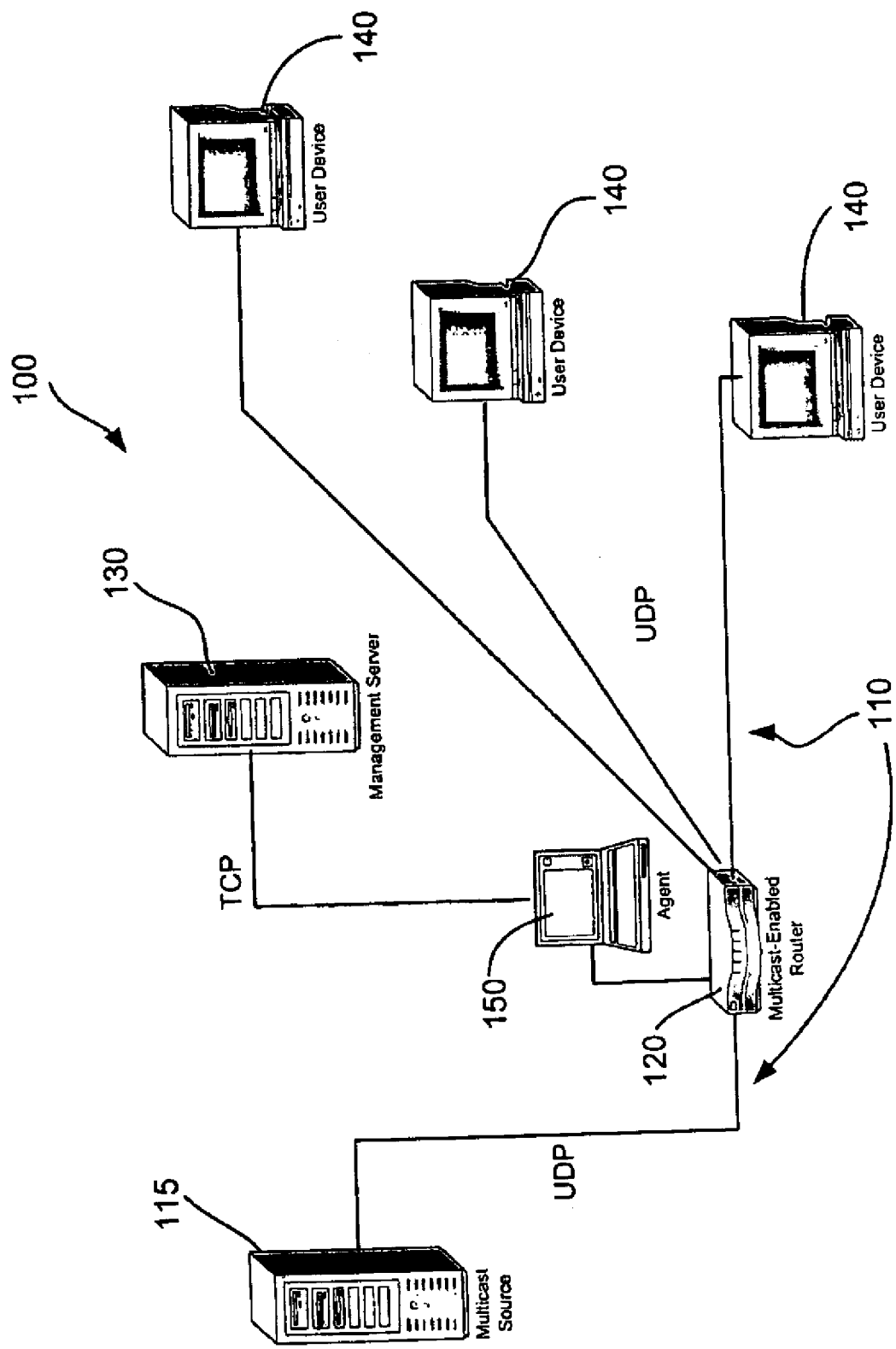
Figure 2:
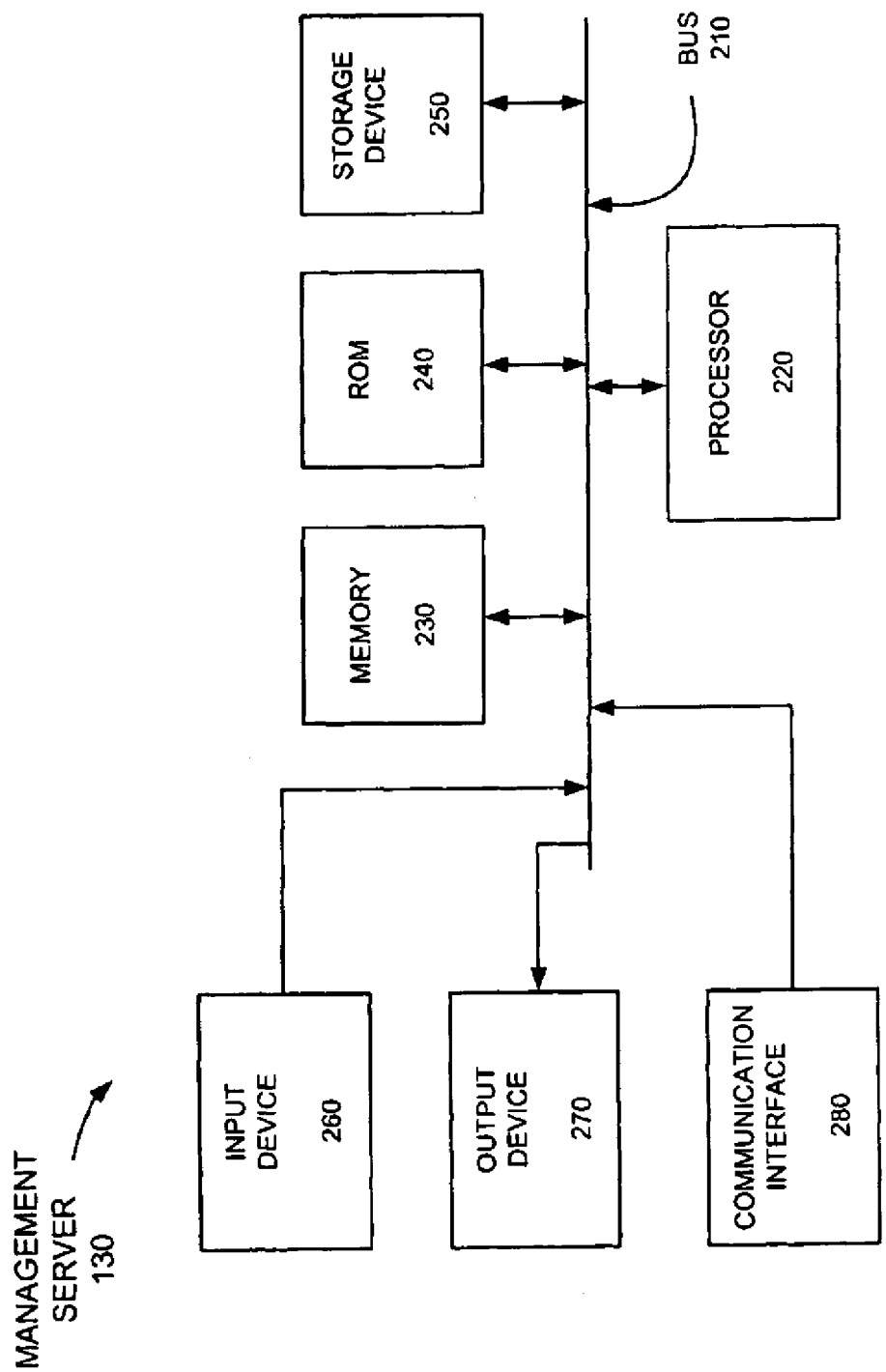
Figure 3:
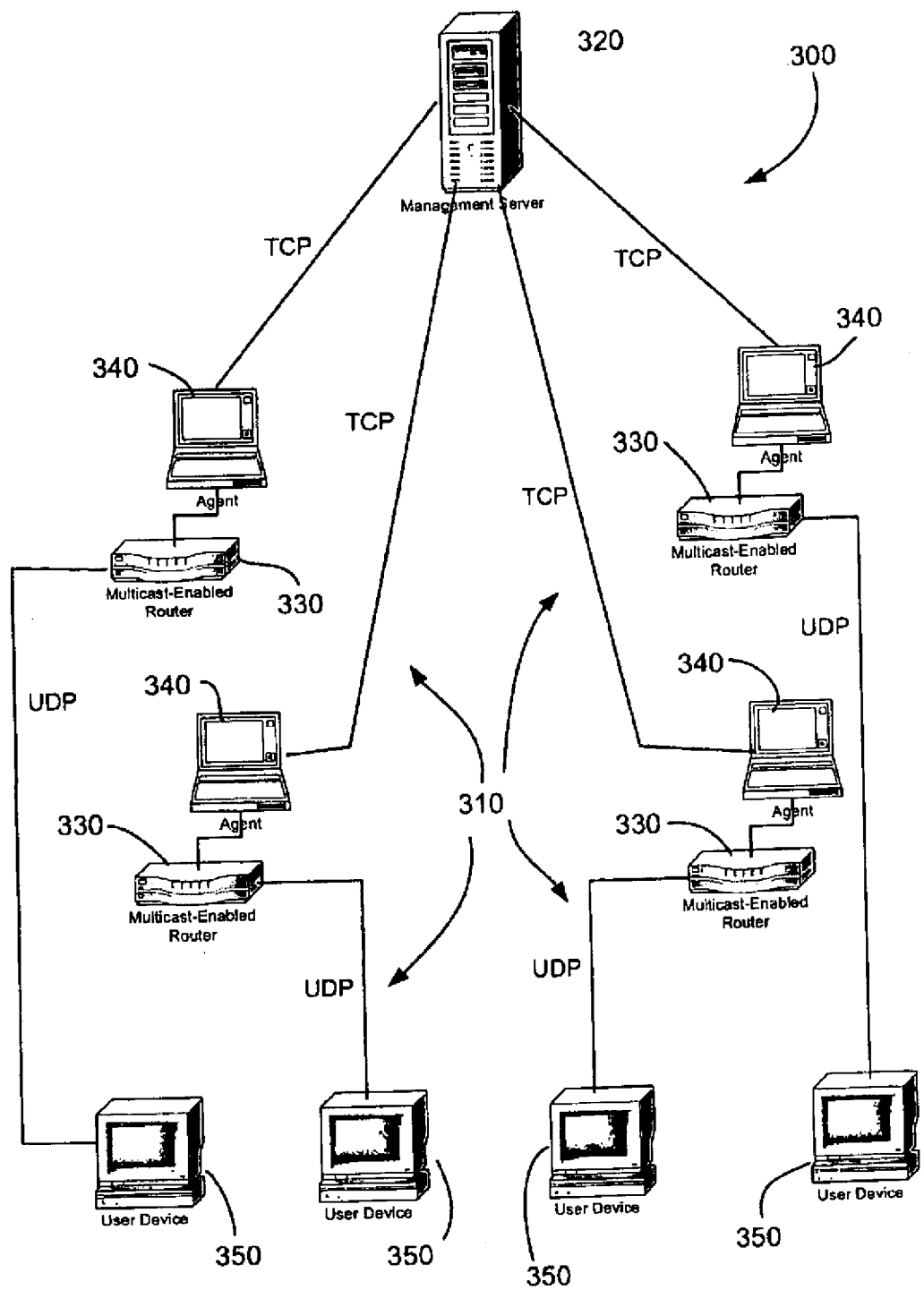
Figure 4:
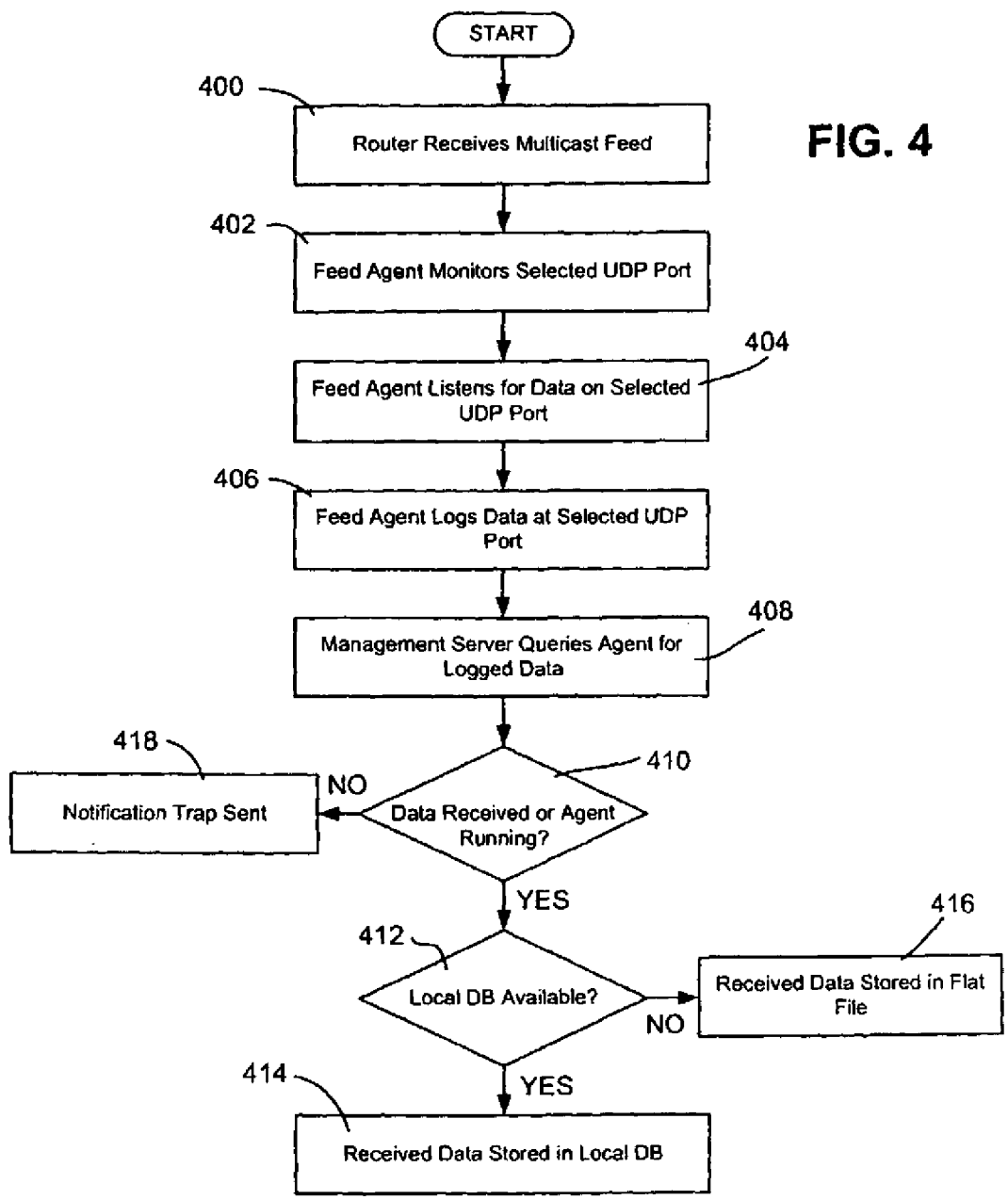
Figure 5:
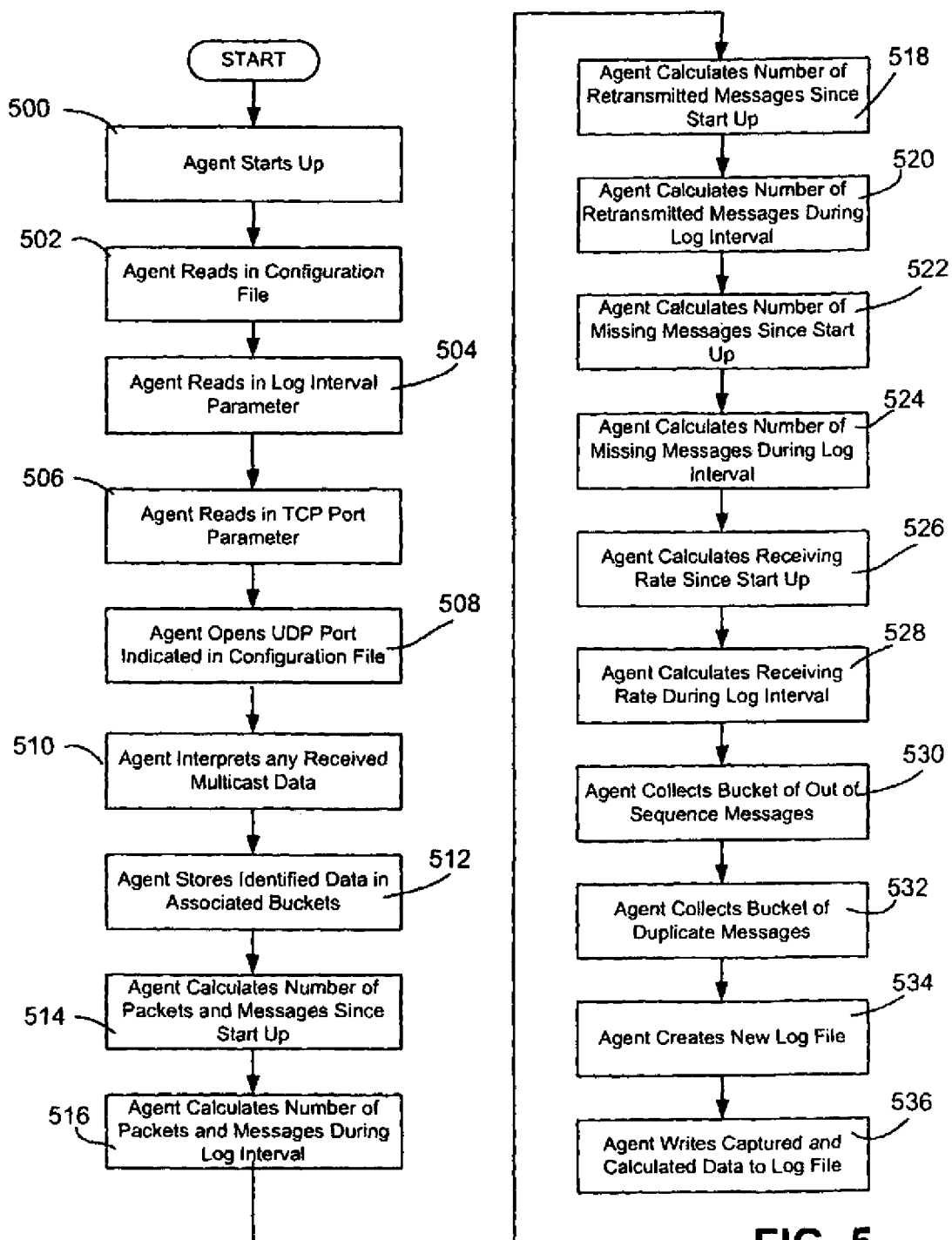
Figure 6:
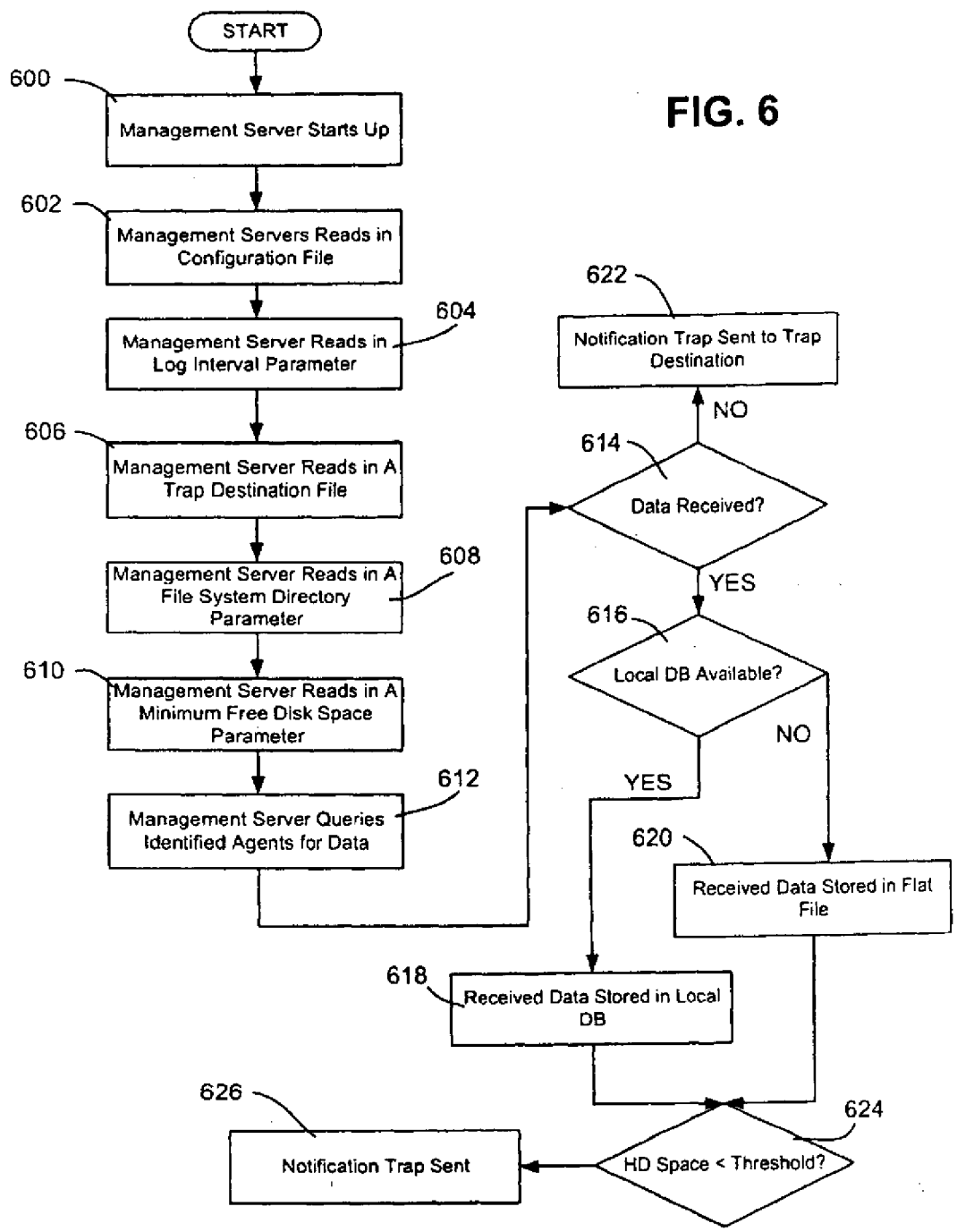
Figure 7:
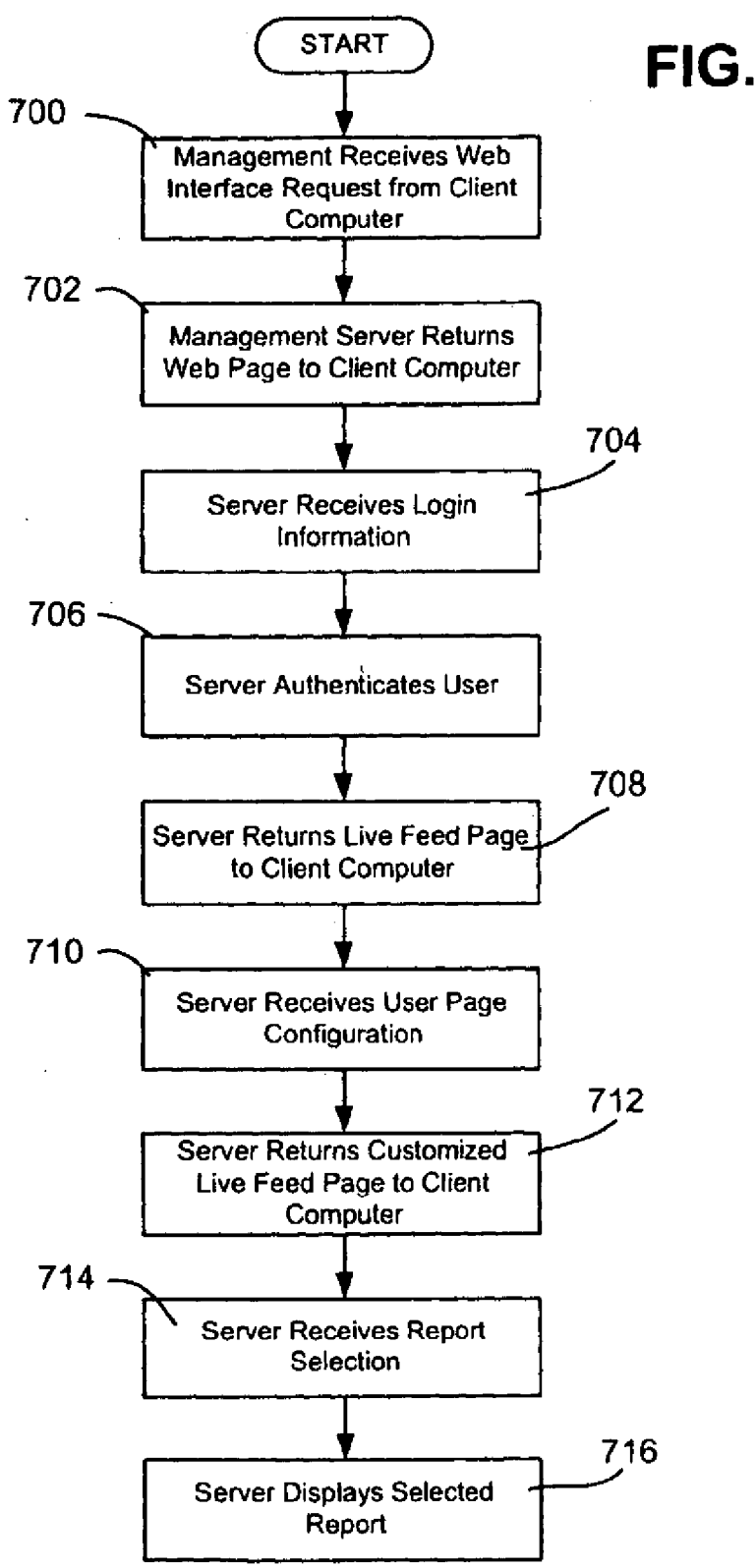
Figure 8:
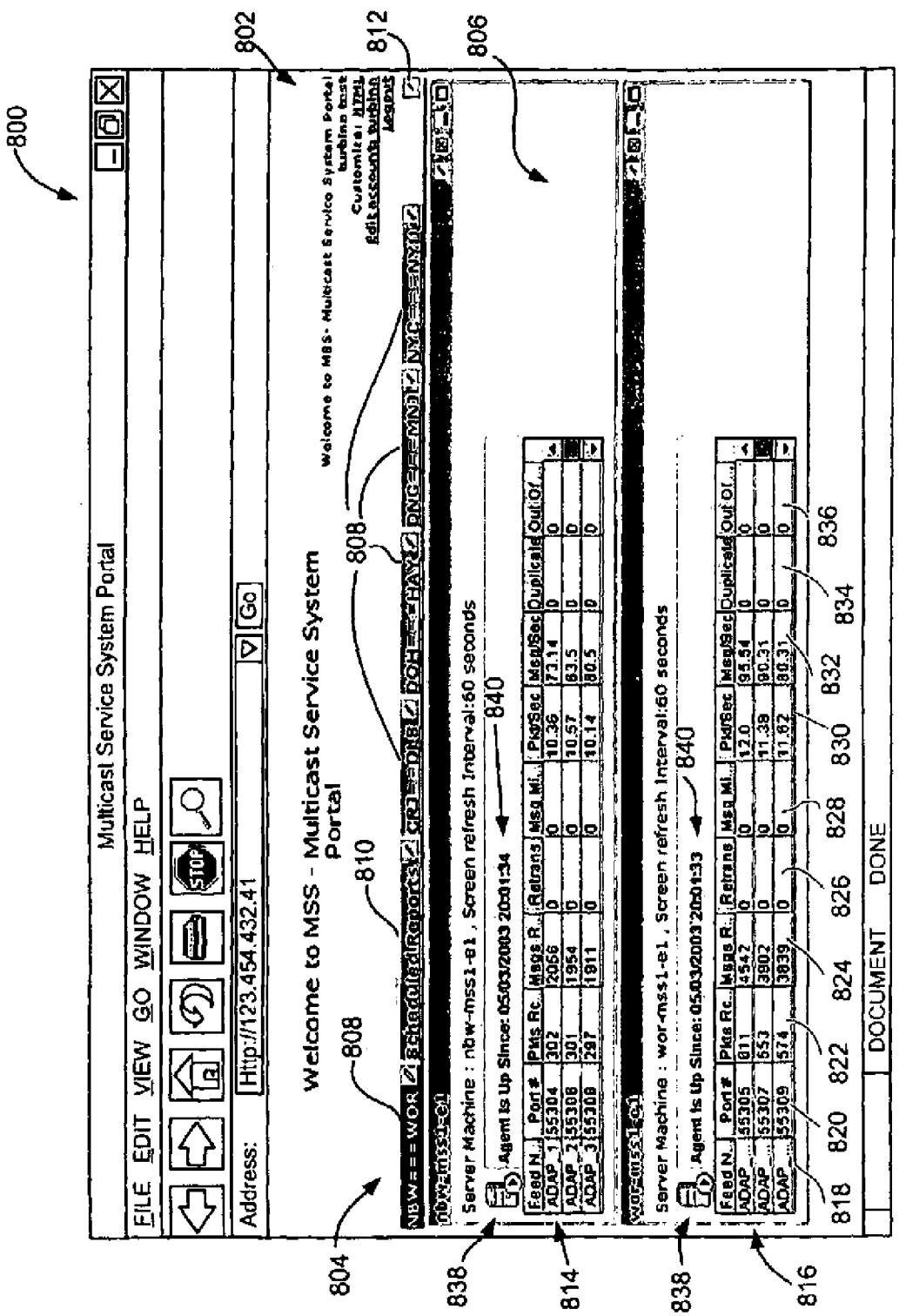
Figure 9:
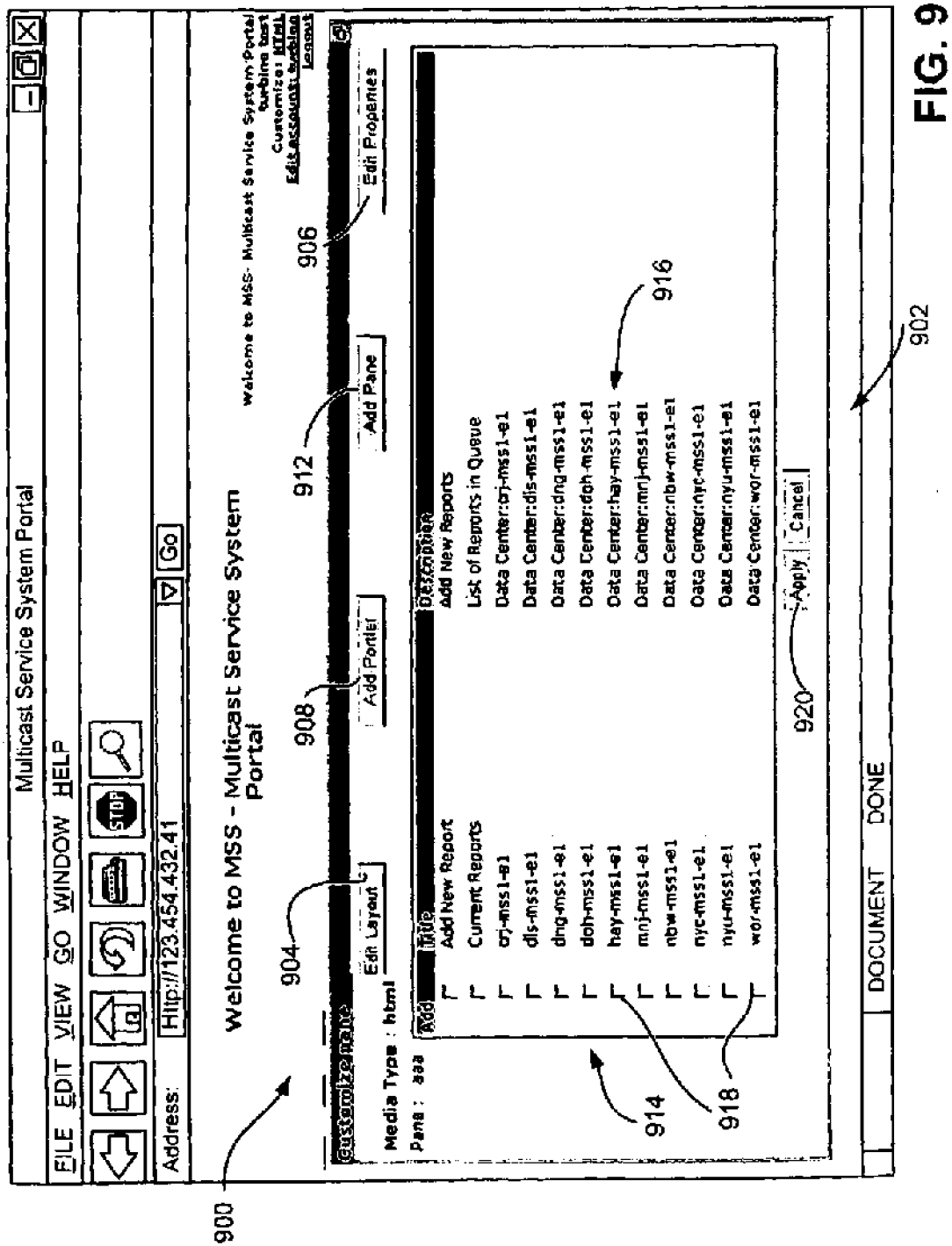

FIG. 9 is an exemplary graphical user interface of a customize page 900 in accordance with an implementation consistent with the principles of the invention. As discussed above, customize page 900 is provided to users in response to selection of customize icon 812 and enables users to configure the content and layout of the live feed page 800. As with page 800, an initial management/administration area is provided at the top of customize page 900. Next, a customization panel 902 is provided with a plurality of options enabling users to select the element or content they wish to customize. User selection of an edit layout button 904 results in the display of a customization panel (not shown) relating to graphical layout of the live feed page 800.

Selection of an edit properties button 906 results in the display of a customization panel (not shown) relating to the properties of the live feed page. More particularly, the edit properties customization panel enables users to change their browser view to set such things as the color of the panes, the style of the display (Tabular, single row, multiple rows), and login preferences. Each user can individually customize the agents that they wishes to view or monitor.

User selection of an add portlet button 908 results in the display of a portlet configuration panel (not shown). In one implementation, portlet configuration panel enables users to select agent or groups of agents for monitoring on the live feed page 800. Preferably, a listing of available agent or agent groups is provided as well as a listing of available "buckets" for display relating to the selected agents. The available "buckets" refer to the types of information collected by agent from its associated network device. More specifically, the available "buckets" may include such values as: 1) packets per second, 2) messages per second, 3) duplicates, 4) gaps (missed messages). Buckets can be selected or deselected so that only the specific information the user wants to view is displayed in the browser window.

User selection of an add pane button 912 results in the display of an add pane configuration panel 914. Add pane configuration panel 914 includes a listing of all available content pane elements 916 with descriptions. Additionally, selectable checkboxes 918 enable users to select which panes they would like to add. The panes are then added to the live feed page by clicking an apply button 920.

Returning to FIG. 8, one exemplary agent portlets area 806 is shown relating to statistics from feed agents 150. Portlet 814 relates to data received from agent nbw-mss1-e1, while portlet 816 relates to data received from agent wor-mss1-e1. As shown, each of the illustrated agents concurrently monitor three distinct multicast feeds. Additionally, as configured by the user, the portlets include the following feed data statistics: feed name 818, port number 820, packets received 822, messages received 824, the number of retransmitted messages 826, the number of missed messages 828, the rate of packets per second 830, the rate of messages per second 832, the number of duplicate messages 834, and the number of out of sequence messages 836.

In addition to feed statistics, each portlet 814 and 816 provide a graphical indication 838 of agent status, with an green arrow (shown) indicating that the agent is up and running and a red square (not shown) indicating that the agent is down. Additionally, a time since up or time since down indication 840 is also provided to aid in troubleshooting or system analysis.

Figure 10:
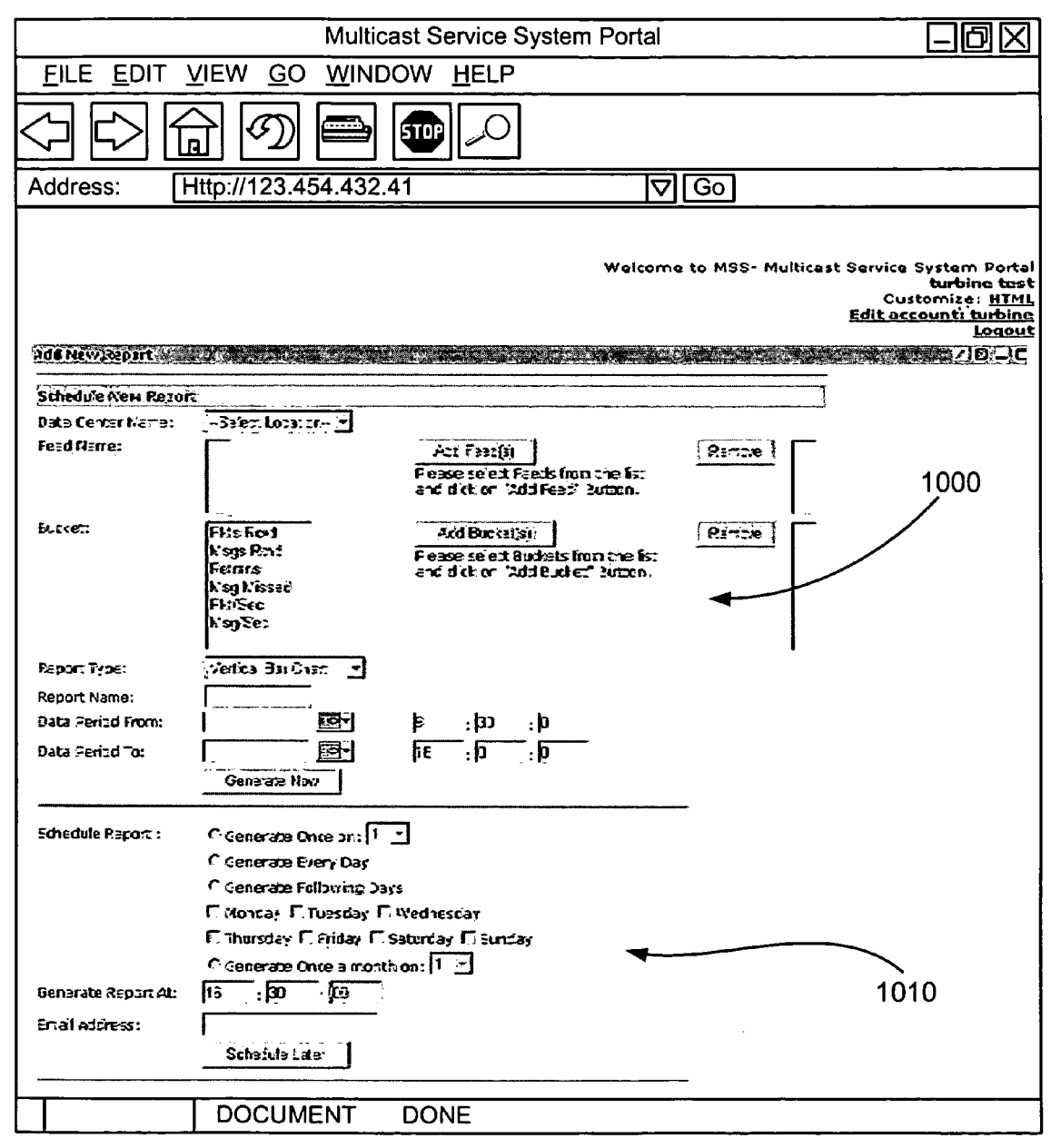

As mentioned briefly above, the present web interface may also be utilized to generate and present reports relating to agent feed statistics. Upon receipt of a user selection of the reports tab 810, a listing of various predefined reports may be presented for user selection. Selection of any particular report results in the display of the actual report for review and/or printing. Alternatively, users may establish a new report by selecting which data sources, feeds, and statistical buckets to include as well as its display type. FIG. 10 is one exemplary graphical interface for enabling creation of a new report in accordance with principles of the invention. As illustrated, in addition to selecting content in content section 1000, a report schedule may also be established in section 1010, such as generate once, daily, specific times, etc. Additionally, an email address text entry block, may also be provided to enable the generated report to be emailed to a particular email address upon completion.

Returning to FIG. 7, once server 130 returns the live feed page 800 to the user at user device 140, the user configures the page contents (act 710) by submitting customization elements to the server 130 in the manner described above. Next, the server 130 returns a customized live feed page 800 to the user device 140 for review by the user (act 712).

Additionally, as described above, the web interface may also provide the user with an option to generate and schedule reports. Reports may be based on filters, such as desired data centers, desired buckets, desired period (from, to), etc. Accordingly, the server 130 receives a user selection of a particular report (act 714). The selected report is then displayed for review (act 716).

Upon an initial view to the live feed page 800, the user may manage their preferences by selecting agents to monitor, selecting the buckets to display, and selecting a web interface refresh interval. Once the user sets his preferences, he would see the live feed statistics from the selected data centers.

CONCLUSION

Implementations consistent with the principles of the invention provide multicast feed administrators with an easy-to-use resource for monitoring and maintaining such feeds.

The foregoing description of exemplary embodiments of the present invention provides illustration and description, but is not intended to be exhaustive or to limit the invention to the precise form disclosed. Modifications and variations are possible in light of the above teachings or may be acquired from practice of the invention. For example, one or more of the acts described with respect to FIGS. 4-7 may be performed by feed agent 150, or management server 130 or any other suitable device (or combination of devices) in system 100 or various devices in system 300.

Moreover, while series of acts have been described with regard to FIGS. 4-7, the order of the acts may be varied in other implementations consistent with the present invention. Moreover, non-dependent acts may be implemented in parallel.

It will also be apparent to one of ordinary skill in the art that aspects of the invention, as described above, may be implemented in many different forms of software, firmware, and hardware. The actual software code or specialized control hardware used to implement aspects consistent with the principles of the invention is not limiting of the present invention. Thus, the operation and behavior of the aspects of the invention were described without reference to the specific software code—it being understood that one of ordinary skill in the art would be able to design software and control hardware to implement the aspects based on the description herein.

Further, certain portions of the invention may be implemented as "logic" that performs one or more functions. This logic may include hardware, such as an application specific integrated circuit or a field programmable gate array, software, or a combination of hardware and software.

No element, act, or instruction used in the description of the present application should be construed as critical or essential to the invention unless explicitly described as such. Also, as used herein, the article "a" is intended to include one or more items. Where only one item is intended, the term "one" or similar language is used.

What is claimed is:

1. A system for monitoring a multicast feed, comprising
   a multicast-enabled network device for transmitting the multicast feed from a multicast feed source to a user device via a network;
   a feed agent operatively coupled to the multicast-enabled network device for collecting and storing statistical data relating to the multicast feed,
   where the feed agent is to:
      execute a configuration file during start up, the configuration file including at least an indication of a user datagram protocol (UDP) port on the multicast-enabled network device to monitor, and an Internet protocol (IP) address associated with the multicast feed; and
   a management server operatively coupled to the feed agent for receiving the statistical data collected by the feed agent, where the management server is to:
      execute a configuration file during start up, the configuration file including at least an indication of a host name and IP address associated with the feed agent;
      identify a log interval time indicating a frequency with which polling of the feed agent is conducted;
      periodically request the statistical data relating to the multicast feed from the feed agent;
      determine whether the statistical data relating to the multicast feed is received in response to the request;
      send a notification to a trap destination address when the statistical data relating to the multicast feed is not received; and
      store, in a database, the statistical data relating to the multicast feed when the statistical data is received in response to the request.

2. The system of claim 1, where the multicast feed is transmitted from the multicast-enabled network device to the user device using a user datagram protocol (UDP).

3. The system of claim 1, where the multicast-enabled network device comprises a multicast-enabled router.

4. The system of claim 1, where the multicast feed comprises financial data, collaborative whiteboard data, or streaming media.

5. The system of claim 1, where the collected statistical data relating to the multicast feed is transmitted from the feed agent to the management server using a transmission control protocol (TCP).

6. The system of claim 1, where the feed agent is to:
   monitor the multicast feed received by the multicast-enabled network device; and
   transmit the statistical data relating to the multicast feed to the management server in response to periodic requests from the management server.

7. The system of claim 6, where the feed agent is further to:
   identify a log interval time indicating the frequency with which collections of the statistical data relating to the multicast feed are conducted; and
   identify a transmission control protocol (TCP) port associated with incoming requests from the management server.

8. The system of claim 1, where the statistical data relating to the multicast feed includes at least one multicast feed data element.

9. The system of claim 8, where the at least one multicast feed data element comprises a sequence number associated with received data units.

10. The system of claim 9, where the at least one multicast feed data element comprises a retransmission identification associated with received data units.

11. The system of claim 1, where the feed agent is further to:
    calculate, based on the statistical data relating to the multicast feed, at least one value from a group comprising:
       a number of packets and messages received since the feed agent has started, a number of packets and messages received during a user-defined time interval, a number of re-transmitted messages since the feed agent has started, a number of re-transmitted messages during the user-defined time interval, a number of missing messages since the feed agent has started, a number of missing messages during the user-defined time interval, a number of out of sequence messages, a number of duplicate messages, a rate of packets and messages received per second since the feed agent has started, or a rate of packets and messages per second for the user-defined time interval.

12. The system of claim 1, where the management server is for periodically polling the feed agent and receiving the available multicast feed data based on the polling.

13. The system of claim 1, where the management server is further to:
    determine whether the database is available; and
    write the received statistical data relating to the multicast feed to a flat data file when the database is not available.

14. The system of claim 1, where the management server is to:
    identify a hard disk drive threshold during start up;
    periodically determine if available hard disk drive space is less than the hard disk drive threshold; and
    send a notification to the trap destination address when the available hard disk drive space is less than the hard disk drive threshold.

15. The system of claim 1, where the management server includes a web server for enabling review of the stored statistical data relating to the multicast feed by a client computer device over the network.

16. The system of claim 15, where the web server provides a customizable interface for retrieving and viewing the stored statistical data relating to the multicast feed.

17. The system of claim 15, where the web server provides for dynamic report generating relating to user-defined portions of the stored statistical data relating to the multicast feed.

18. The system of claim 15, where the web server is to:
receive a request from the client computer device for information relating to the stored statistical data relating to the multicast feed;
retrieve the requested statistical data relating to the multicast feed; and
present the requested statistical data relating to the multicast feed to the client computer device for display in substantially real time.

19. A method for monitoring a multicast feed transmitted via a network, comprising:
executing, by a server, a configuration file during start up, the configuration file including at least an indication of a host name and an Internet protocol (IP) address associated with a feed agent;
identifying, by the server, a log interval time indicating a frequency with which agent polling is conducted;
receiving, at a network device connected to the feed agent, the multicast feed from a data source;
logging, at the feed agent, data statistics regarding the multicast feed;
transmitting the multicast feed to a user device;
periodically requesting, by the server, the logged data statistics;
determining whether the logged data statistics are received by the server in response to the request;
sending, by the server, a notification to a trap destination address when the logged data statistics are not received;
storing the logged data statistics in a database associated with the server when the logged data statistics are received;
and
calculating, based on the logged data statistics, at least one value from a group comprising:
a number of packets and messages received since the feed agent has started, a number of packets and messages received during a user-defined time interval, a number of re-transmitted messages since the feed agent has started, a number of re-transmitted messages during the user-defined time interval, a number of missing messages since the feed agent has started, a number of missing messages during the user-defined time interval, a number of out of sequence messages, a number of duplicate messages, a rate of packets and messages received per second since the feed agent has started, and a rate of packets and messages per second for the user-defined time interval.

20. The method of claim 19, where the multicast feed comprises a user datagram protocol (UDP) data feed.

21. The method of claim 19, where the logged data statistics are transmitted to the server upon request using a transmission control protocol (TCP).

22. The method of claim 19, further comprising:
executing a configuration file during start up of the feed agent, the configuration file including at least an indication of a user datagram protocol (UDP) port on the network device to monitor, and an IP address associated with the multicast feed;
identifying, by the feed agent, a log interval time indicating the frequency with which data statistic logging is to be conducted; and
identifying, by the feed agent, a TCP port associated with incoming requests from the server.

23. The method of claim 19, where logging data statistics regarding the multicast feed further comprises:
capturing a sequence number associated with multicast data units included in the multicast feed; and
capturing a retransmission identification associated with the multicast data units.

24. The method of claim 19, further comprising:
receiving, at a web server associated with the server, a request from a client system for information relating to the stored logged data statistics;
retrieving the requested logged data statistics from the database; and
transmitting the requested logged data statistics to the client system for display in substantially real time.

25. A computer-readable memory device containing instructions for controlling one or more processors to perform a method for monitoring a multicast feed transmitted via a network, the method comprising:
executing, by a server, a configuration file during start up, the configuration file including at least an indication of a host name and an Internet protocol (IP) address associated with a feed agent;
identifying, by the server, a log interval time indicating a frequency with which agent polling is conducted;
receiving, at a network device connected to the feed agent, the multicast feed from a data source;
logging, at the feed agent, data statistics regarding the multicast feed;
transmitting the multicast feed to a user device;
periodically requesting, by the server, the logged data statistics;
determining whether the logged data statistics are received by the server in response to the request;
sending a notification to a trap destination address when the logged data statistics are not received; and
storing the logged data statistics in a database associated with the server when the logged data statistics are received.

* * * * *

UNITED STATES PATENT AND TRADEMARK OFFICE
CERTIFICATE OF CORRECTION

PATENT NO.       : 7,756,033 B2
APPLICATION NO.  : 10/836284
DATED            : July 13, 2010
INVENTOR(S)      : Edward W. Abbazia, Jr. et al.

It is certified that error appears in the above-identified patent and that said Letters Patent is hereby corrected as shown below:

On the Title Page

After item (57) Abstract delete "25 Claims, 9 Drawing Sheets" and insert in its place --25 Claims, 10 Drawing Sheets-- as shown on the attached Title Page.

In the Drawings

Delete drawing sheets 1-9, consisting of Figs. 1-10 and insert Drawing Sheets 1-10, consisting of Figs 1-10 as shown on the attached pages.

Signed and Sealed this
Sixth Day of August, 2013

Teresa Stanek Rea
*Acting Director of the United States Patent and Trademark Office*

(12) United States Patent
Abbazia, Jr. et al.

(10) Patent No.: US 7,756,033 B2
(45) Date of Patent: Jul. 13, 2010

(54) SYSTEMS AND METHODS FOR MANAGING MULTICAST DATA TRANSMISSIONS

(75) Inventors: Edward W. Abbazia, Jr., Milford, CT (US); James H. Pelisson, Sandy Hook, CT (US)

(73) Assignee: Verizon Business Global LLC, Basking Ridge, NJ (US)

( * ) Notice: Subject to any disclaimer, the term of this patent is extended or adjusted under 35 U.S.C. 154(b) by 1766 days.

(21) Appl. No.: 10/836,284

(22) Filed: May 3, 2004

(65) Prior Publication Data
US 2005/0243824 A1    Nov. 3, 2005

(51) Int. Cl.
*H04L 1/00*     (2006.01)
*H04L 12/26*    (2006.01)

(52) U.S. Cl. .................................. 370/235; 370/230
(58) Field of Classification Search .............. None
See application file for complete search history.

(56) References Cited

U.S. PATENT DOCUMENTS

| | | | |
|---|---|---|---|
| 5,331,637 | A | 7/1994 | Francis et al. |
| 5,602,841 | A | 2/1997 | Lebizay et al. |
| 5,903,559 | A | 5/1999 | Acharya et al. |
| 5,946,316 | A | 8/1999 | Chen et al. |
| 6,006,267 | A | 12/1999 | Nguyen et al. |
| 6,058,113 | A | 5/2000 | Chang |
| 6,088,732 | A | 7/2000 | Smith et al. |
| 6,112,236 | A * | 8/2000 | Dollin et al. ............. 709/224 |
| 6,151,696 | A | 11/2000 | Miller et al. |
| 6,154,463 | A | 11/2000 | Aggarwal et al. |
| 6,182,109 | B1 | 1/2001 | Sharma et al. |
| 6,259,701 | B1 | 7/2001 | Shur et al. |
| 6,279,029 | B1 | 8/2001 | Sampat et al. |
| 6,282,175 | B1 * | 8/2001 | Steele et al. ............. 370/254 |
| 6,331,983 | B1 | 12/2001 | Haggerty et al. |
| 6,353,596 | B1 | 3/2002 | Grossglauser et al. |
| 6,415,330 | B1 | 7/2002 | Okanoue |
| 6,434,622 | B1 * | 8/2002 | Monteiro et al. ......... 709/231 |
| 6,434,626 | B1 | 8/2002 | Prakash et al. |
| 6,483,832 | B1 | 11/2002 | Civanlar et al. |
| 6,512,776 | B1 | 1/2003 | Jones et al. |
| 6,515,967 | B1 | 2/2003 | Wei et al. |
| 6,557,111 | B1 | 4/2003 | Theimer et al. |
| 6,940,821 | B1 * | 9/2005 | Wei et al. ................ 370/244 |

(Continued)

OTHER PUBLICATIONS

"The UTP Plan Quotation Data Feeds$^{SM}$ (UQDF$^{SM}$): Data Feed Interface Specification", Published by NASDAQ Market Data Distribution, Rockville, Maryland, Version 4.0a, Revised: Oct. 31, 2003.

(Continued)

*Primary Examiner*—Ricky Ngo
*Assistant Examiner*—Clemence Han

(57) ABSTRACT

A system enables monitoring a multicast data feeds over a network. The system may include a multicast-enabled network device for transmitting a multicast feed from a multicast feed source to a user device via a computer network. A feed agent may be operatively coupled to the multicast-enabled network device for collecting and storing multicast feed data from the multicast feed source. A management server may be operatively connected to the feed agent for receiving multicast feed data collected by the feed agent. The management server may include a web server for receiving requests for multicast feed data over the network via a web interface.

25 Claims, 10 Drawing Sheets

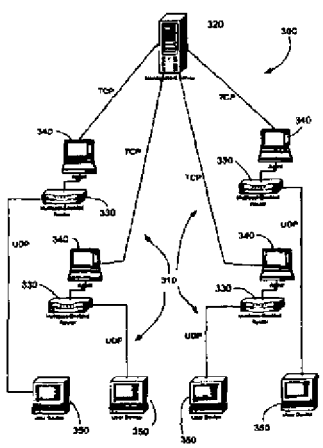

FIG. 10